United States Patent [19]

Kumagi

[11] 4,342,092

[45] Jul. 27, 1982

[54] INTEGRATED CIRCUIT DEVICE FOR CLOCK

[75] Inventor: Shigeki Kumagi, Yokohama, Japan

[73] Assignee: Tokyo Shibaura Denki Kabushiki Kaisha, Japan

[21] Appl. No.: 124,600

[22] Filed: Feb. 25, 1980

[30] Foreign Application Priority Data

| | | | |
|---|---|---|---|
| Feb. 27, 1979 | [JP] | Japan | 54-22202 |
| Feb. 27, 1979 | [JP] | Japan | 54-22203 |
| Feb. 27, 1979 | [JP] | Japan | 54-22204 |

[51] Int. Cl.³ .............................................. G06F 15/20

[52] U.S. Cl. ........................................ 364/569; 364/705

[58] Field of Search .................... 364/569, 705; 368/6, 368/9, 14, 107, 108

[56] References Cited

U.S. PATENT DOCUMENTS

| | | | |
|---|---|---|---|
| 3,967,098 | 6/1976 | Harnagel et al. | 364/569 X |
| 4,035,627 | 7/1977 | Dickinson et al. | 364/706 |
| 4,065,663 | 12/1977 | Edwards | 364/569 X |
| 4,158,285 | 6/1979 | Heinsen et al. | 364/569 X |
| 4,192,130 | 3/1980 | Takeuchi | 364/569 X |

*Primary Examiner*—Jerry Smith

*Attorney, Agent, or Firm*—Finnegan, Henderson, Farabow, Garrett & Dunner

[57] ABSTRACT

A clock integrated circuit comprises an oscillator circuit for producing a basic frequency signal, a frequency divider for frequency dividing the basic frequency signal to a predetermined frequency, a time measuring circuit for counting output pulses from the frequency divider to produce time data consisting of 1-second, 10-seconds, 1-minute, 10-minutes, 1-hour and 10-hours digits or a combination of some of these digits and a display driver circuit for displaying the time data on an external display means. Further, it comprises a digit selection circuit which outputs the afore-said time data such that the time data can be directly coupled to a central processing element.

4 Claims, 69 Drawing Figures

ST

CP

CPa

CPb

CP1

CP2

CP3

CP4

TIME
INFO
1-MINUTE DIGIT
10-MINUTES DIGIT
1-HOUR DIGIT
10-HOURS DIGIT
1-MINUTE DIGIT

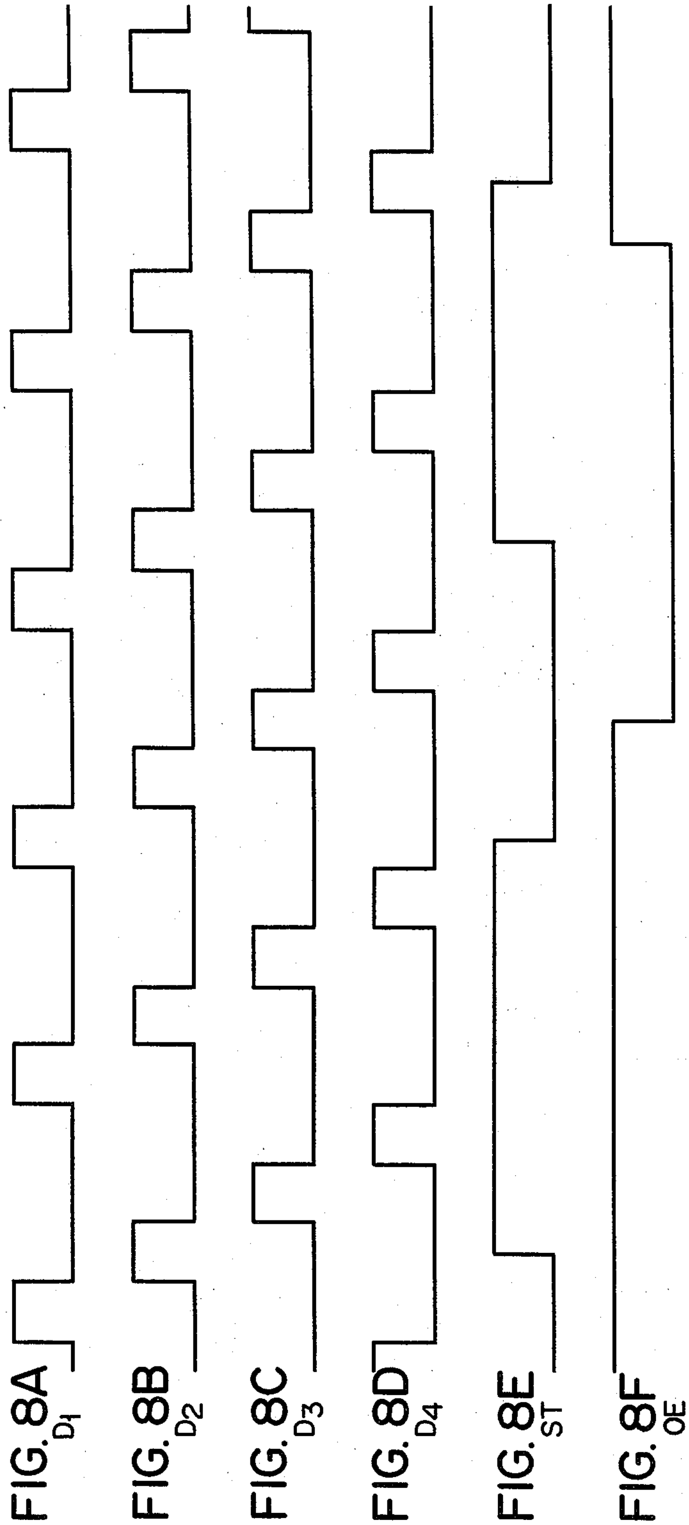
FIG. 8A $D_1$
FIG. 8B $D_2$
FIG. 8C $D_3$
FIG. 8D $D_4$
FIG. 8E ST
FIG. 8F OE

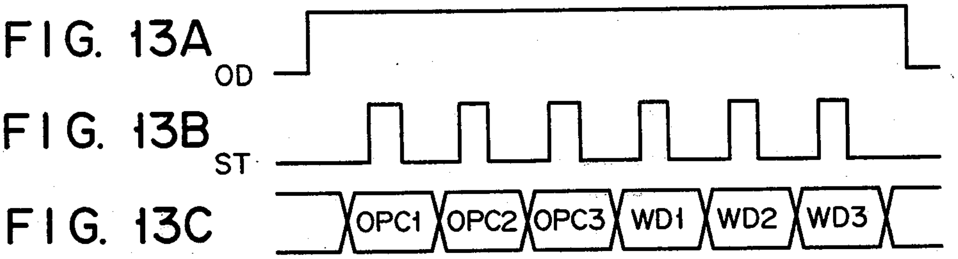
FIG. 13A
FIG. 13B
FIG. 13C
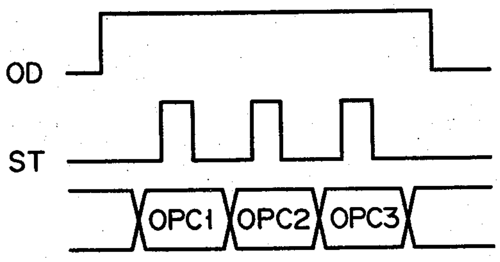
FIG. 13D
FIG. 13E
FIG. 13F
FIG. 14
| BIT | 1 | 2 | 3 | 4 |
|---|---|---|---|---|
| OPC1 | "1" | R/W | A1 | A2 |
| OPC2 | A3 | A4 | A5 | A6 |
| OPC3 | D1 | D2 | D3 | D4 |

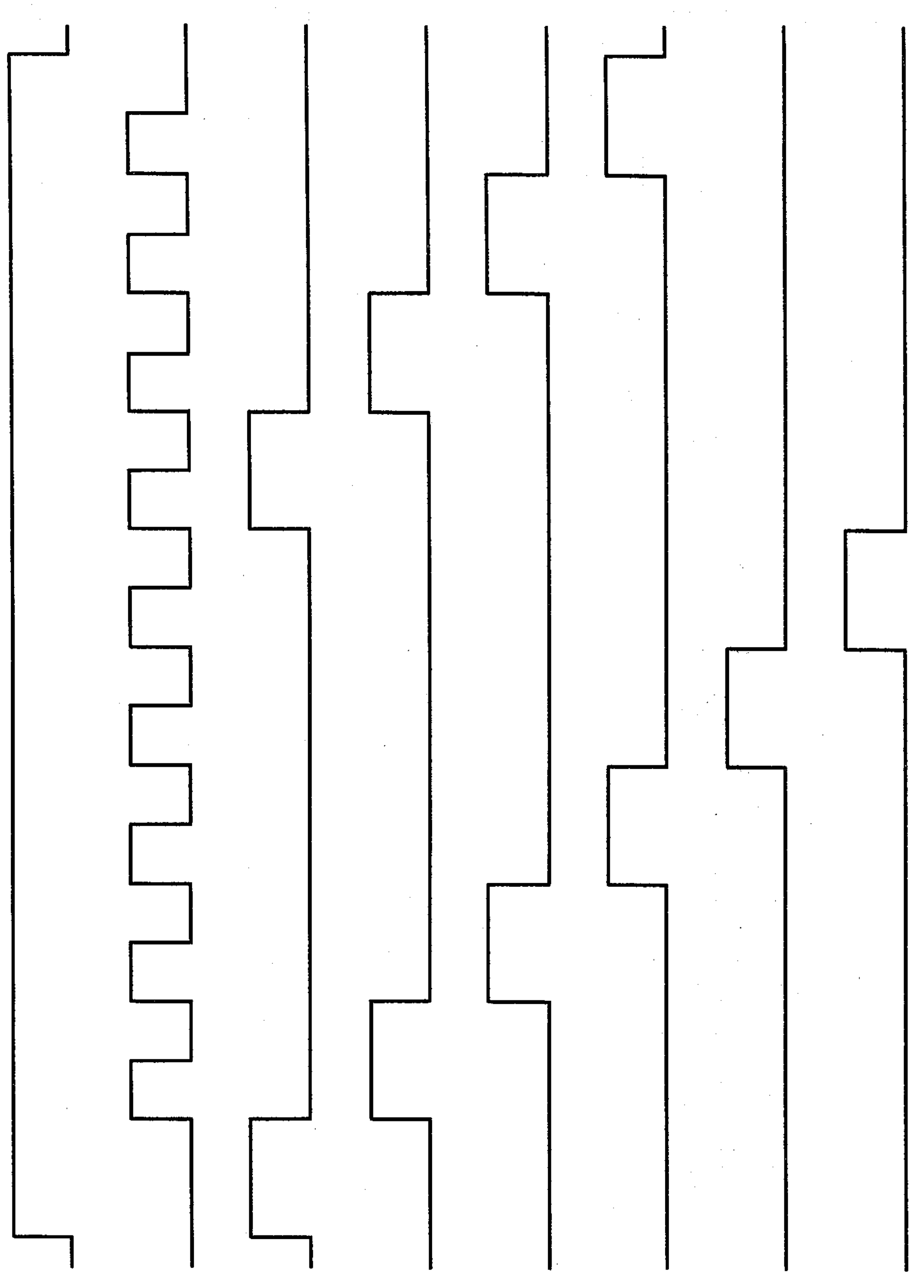
FIG. 20A CP
FIG. 20B ST
FIG. 20C CP1
FIG. 20D CP2
FIG. 20E CP3
FIG. 20F CP4
FIG. 20G CP5
FIG. 20H CP6

INTEGRATED CIRCUIT DEVICE FOR CLOCK

BACKGROUND OF THE INVENTION

This invention relates to integrated circuit devices for digital clocks and, more particularly, to an integrated circuit device for digital clocks, which is capable of transmitting time information to an external data processing unit such as a microprocessor.

Up to date, integrated circuit devices for digital clocks are inexpensively available, and also they find very extensive applications. These applications include those where they are used for timer processing in combination with various systems other than those dealing with time information such as time clocks, calendars and stopwatches. Further, in the field of controls and applications dealing with unit time such as one minute and one second there is a demand for combining an integrated or LSI circuit with a central processing unit (CPU) such as a microprocessor. Such demand is based upon a concept that with the provision of the microprocessor with a function as clock, the processing efficiency of the microprocessor is reduced for the clock function must be fulfilled by part of the processing capacity of the microprocessor, and that it is thus better to realize the clock function with an exclusive clock LSI circuit device and permit time information such as time-of-day data to be transferred from the exclusive LSI circuit device to the microprocessor when required.

With the prior-art clock LSI circuit device, however, time information which is to be coupled to the microprocessor is produced from terminals for time-of-day data display drive signal. Therefore, a converting circuit for converting, for instance, a 7-segment display drive signal into a corresponding BCD code for coupling to the microprocessor must be connected between the clock LSI circuit and microprocessor.

FIG. 1 is a schematic showing the connection of a prior-art clock LSI circuit device and a microprocessor as central processing unit (CPU).

Referring to the FIG. 1, a clock LSI circuit 12 provides 1-minute, 10-minutes, 1-hour and 10-hours digit outputs. These outputs, which are each 7-bit display data, are coupled to respective 7-segment display sections 14$_1$, 14$_2$, 14$_3$ and 14$_4$ for displaying time information (as static display in this case). Meanwhile, these outputs are also supplied to respective converting circuit sections 18$_1$, 18$_2$, 18$_3$ and 18$_4$ which convert their inputs so that their outputs can be coupled to a microprocessor 16.

The converting circuits 18$_1$, 18$_2$, 18$_3$ and 18$_4$ each include a diode section 20 for cutting off low level potential of the input signal, an encoder 22 and a pull-down resistor section 24 for coupling the level-converted input signal to the encoder 22. The BCD code that is obtained from the encoder 20 in each converting circuit is coupled to data selectors 24$_1$ and 24$_2$, which are 4-channel data selectors and supply time data of a given digit to a microprocessor 16 in accordance with a digit selection signal coupled to them.

FIG. 2 is a schematic showing another example of the connection between prior-art clock LSI circuit and microprocessor. In this example, time information is displayed as dynamic display. In the Figure, like parts as those in FIG. 1 are designated by like reference symbols, and they are described no further.

More particularly, a dynamic clock LSI 26 provides 7-segment information of 7 bits a to g to 7-segment fluorescent tube display sections 28$_1$ to 28$_4$. It also produces digit selection information $D_1$ to $D_4$ which are coupled to the respective display sections 28$_1$ to 28$_4$. Thus, display sections, to which digit selection data of a logical high level are coupled, are energized for display. The time information of 7 bits a to g is also supplied to a converting circuit 18$_1$, which has the same construction as the converting circuits 18$_1$ to 18$_4$ shown in FIG. 1, for conversion to a corresponding BCD code to be supplied to the microprocessor 16. The digit selection information $D_1$ to $D_4$, selectively produced from the clock LSI circuit 26, is also coupled to a level conversion circuit 30, and the level conversion output therefrom is coupled to the microprocessor 16.

As has been shown, where a clock LSI circuit and a CPU are used in combination, the system itself is complicated, and also the processing efficiency of the CPU is reduced.

In addition, for displaying the result of data processing in the microprocessor a separate display unit is connected to a bus line to the microprocessor independently of the display unit for displaying the time information, and this is undesired from the standpoint of economy.

SUMMARY OF THE INVENTION

An object of the invention is to provide a clock integrated circuit device, which can overcome the aforementioned drawbacks and can be directly connected to a central processing unit as well as permitting static display of the result of data processing in the central processing unit on a display unit.

To achieve this object, a clock integrated circuit device according to the invention comprises an oscillator circuit producing a clock pulse signal, a frequency divider circuit frequency dividing the clock pulse signal to a predetermined frequency, a time measuring circuit counting successive output pulse signals from the frequency divider, a switch input circuit connected to the time measuring circuit and supplying control signals for executing correction of the measured time and elapsed timer function to the time measuring circuit, a display drive signal generating circuit connected to the time measuring circuit and decoding time data produced from the time measuring circuit to produce a corresponding time display drive signal, and a digit selection circuit connected to the time measuring circuit and selecting time data produced from the time measuring circuit according to a control signal from an external central processing unit.

Another object of the invention is to provide a clock integrated circuit device, which can be directly connected to a central processing unit permits dynamic display of the result of data processing in the central processing unit on a display unit.

To achieve this object, a clock integrated circuit device according to the invention comprises an oscillator circuit producing a clock pulse signal, a frequency divider frequency dividing the clock pulse signal to a predetermined frequency, a time measuring circuit counting successive pulse signals from the frequency divider, a switch input circuit connected to the time measuring circuit and producing control signals for executing correction of measured time and elapsed timer function, a timing signal generating circuit connected to the frequency divider circuit and producing a digit selection signal constituting time information, a gate circuit group connected to the time measuring circuit and selectively passing time data from the time measuring circuit according to the digit selection signal, a digit driver connected to the timing signal generating circuit and supplying digit data to an external display unit according to digit selection data from the timing signal generating circuit, a segment decoder connected to the gate circuit group and decoding time data produced from the gate circuit group into a corresponding display drive signal, a segment driver connected to the segment decoder and supplying a display drive signal for the display of time information to the external display unit, and a digit selection circuit selecting time data produced from the timing signal generating circuit and time measuring circuit according to a control signal from an external central processing unit.

A further object of the invention is to provide a clock integrated circuit device, which can be directly connected to a central processing unit and permits display of ordinary time information and the result of data processing in the central processing unit on a single display unit.

To achieve this object, a clock integrated circuit device according to the invention comprises an oscillator circuit producing a clock pulse signal, a frequency divider frequency dividing the clock pulse signal to a predetermined frequency, a time measuring circuit counting successive output pulses from the frequency divider, a switch input circuit connected to the time measuring circuit and supplying control signals for executing correction of measured time and elapsed time function to the time measuring circuit, a timing signal generating circuit connected to the frequency divider and producing a digit selection signal constituting time information, a digit selection circuit selecting time data produced from the timing signal generating circuit and time measuring circuit, a digit driver connected to the timing signal generating circuit and supplying digit data to an external display unit according to digit selection data from the timing signal generating circuit, a switching circuit connected to the digit selection circuit and passing time data produced from the digit selection circuit to an external microprocessor or to an external display unit according to a control signal supplied from the external microprocessor, a segment decoder connected to the switching circuit and decoding time data produced from the switching circuit into a corresponding display drive signal, and a segment driver connected to the segment decoder and supplying a driver display signal for the display of time information to the external display unit.

A still further object of the invention is to provide a clock integrated circuit device, which can be directly connected to a central processing unit and permits display of time information according to a program.

To achieve this object, a clock integrated circuit device according to the invention comprises a pulse generating means producing a clock pulse signal, a program memory means storing a microprogram, a time-of-day data determining means determining a time-of-day data by effecting progressive calculations on the clock pulse signal according to the microprogram, a time-of-day data memory means storing information representing the measured time-of-day data, an information input/output means supplying stored time-of-day data information in response to an operation of storing external information in the time-of-day data memory means, and a display control circuit producing a control signal for displaying information obtained by the time-of-day data determining means on an external display unit.

BRIEF DESCRIPTION OF THE DRAWINGS

FIGS. 8A through 8L are timing charts illustrating the operation of the embodiment of FIG. 7;

FIGS. 13A through 13F are timing charts for illustrating the operation of the embodiment of FIG. 10;

FIG. 14 is a view showing an operation code table for illustrating the operation of the embodiment of FIG. 10;

FIGS. 20A to 20H are timing charts for illustrating the operation of a system adopting the digit selection circuit of FIG. 19.

DETAILED DESCRIPTION OF THE PREFERRED EMBODIMENTS

Figures 3A, 3B:
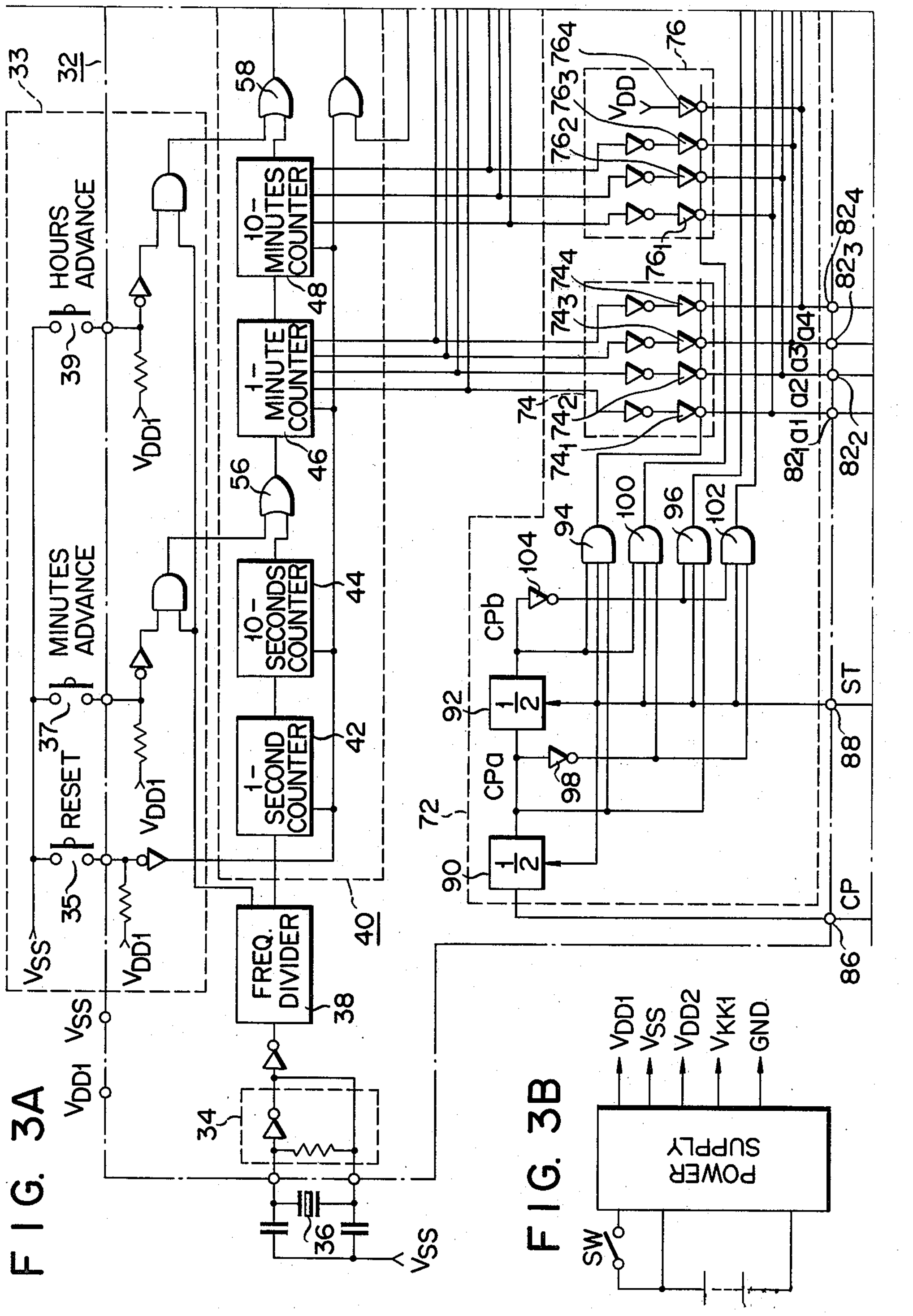
FIGS. 3A through 3D show a schematic representation of one embodiment of the invention.
Figure 3C:
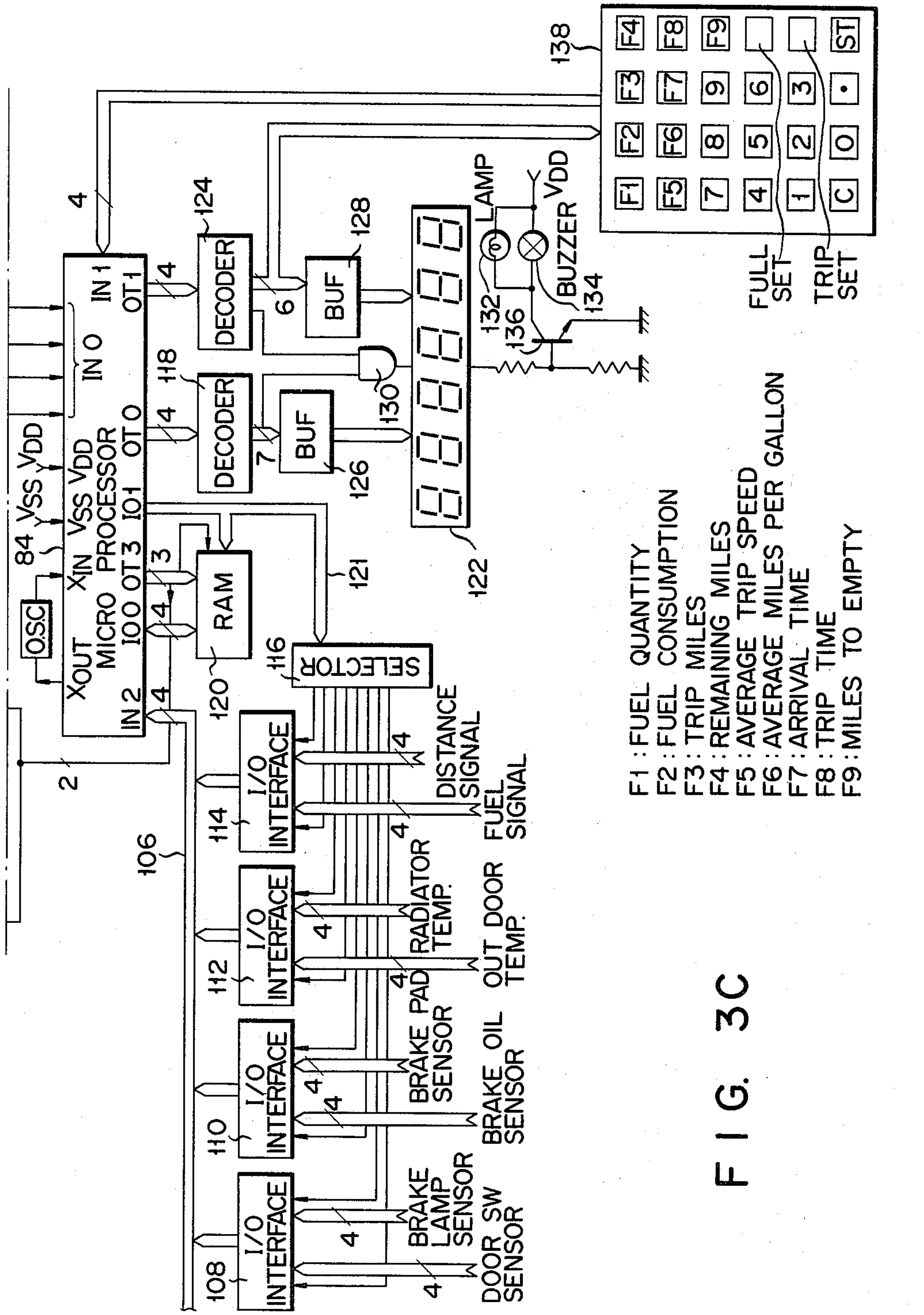
Figure 3D:
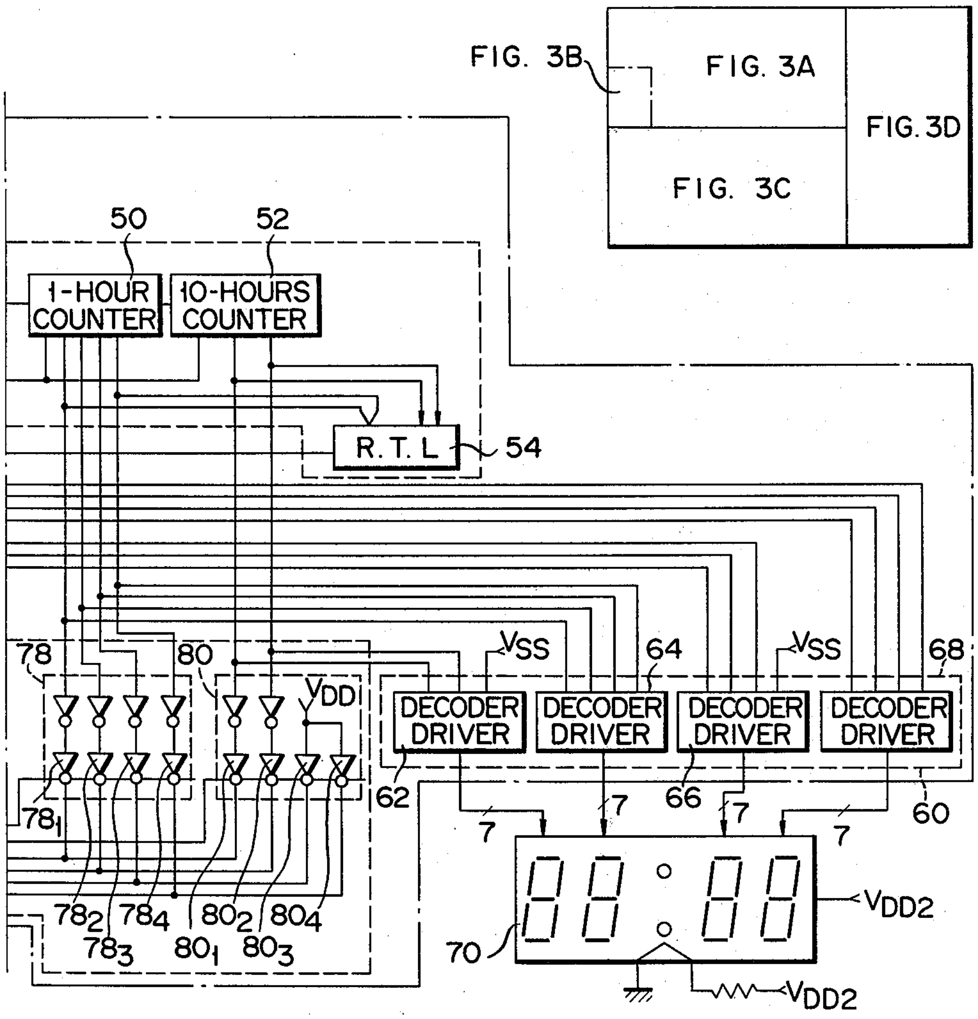

FIG. 3 is a schematic representation of an embodiment of the invention. In the Figure, a portion enclosed within a broken line is a clock LSI circuit device 32 which consists of a single chip. The clock LSI circuit device 32 comprises an oscillator circuit 34. The oscillator circuit 34 is driven by a 4.194304 MHz crystal oscillator provided outside the clock LSI circuit device 32 and produces a clock pulse signal. The clock pulse signal is coupled to a frequency divider 38, which has its input side connected to the output side of the oscillator circuit 34. The frequency divider 38 includes twenty two flip-flop stages and frequency divides the clock pulse input to 1 Hz. It may use, for instance, "CD4040B" (a trade name) circuits manufactured by RCA. The output frequency signal from the frequency divider 38 is coupled to a time measuring circuit 40, which has its input terminal connected to the output terminal of the frequency divider 38. The time measuring circuit device 40 includes a 1-second counter 42, 10-seconds counter 44, 1-minute counter 46, 10-minutes counter 48, 1-hour counter 50, a 10-hours counter 52 and a reset timing logic circuit 54. The 1-second, 1-minute and 1-hour counters 42, 46 and 50 are each constituted by a frequency divider which frequency divides the input frequency signal to one-tenth. These frequency divider circuits may use, for instance, "CD4518B" (a trade name) circuits manufactured by RCA. The 10-seconds and 10-minutes counters 44 and 48 each frequency divide the input frequency signal to one-sixth. They may use, for instance, "CD4013B" (a trade name) circuits manufactured by RCA. The 10-hours counter 52 may use, for instance, "CD4040B" (a trade name) circuits manufactured by RCA. The reset timing logic circuit 52 delivers a reset signal to the 1-hour and 10-hours counters 50 and 52 in accordance with input signals received therefrom. The counters 42, 46 and 50 are 4-bit counters, the counters 44 and 48 are 3-bit counters, and the counter 52 is a 1-bit counter. The output signal of the 1-second counter 42 is coupled to the 10-seconds counter 44, the output signal of the 10-seconds counter 44 is coupled through an OR circuit 56 to the 1-minute counter 46, the output signal of the 1-minute counter 46 is coupled to the 10-minutes counter 48, the output signal of the 10-minutes counter 48 is coupled through an OR circuit 58 to the 1-hour counter 50, and the output signal of the 1-hour counter 50 is coupled to the 10-hours counter 52. Time data for 1-minute, 10-minutes, 1-hour and 10-hours digits, produced from the time measuring circuit 40, are coupled to respective decoder drivers 62, 64, 66 and 68 which constitute a display drive signal generating circuit 60. The display drive signal generating circuit 60 may use, for instance, "CD4511B" (a trade name) circuits manufactured by RCA, and with the time data inputs they produce respective 7-segment display drive signals. These display drive signals are supplied to a 4-digit 7-segment display unit 70 which is connected to the chip.

The display unit 70 may consist of four fluorescent tube display digits each consisting of seven segments and display time information in accordance with the 7-segment display drive signals supplied from the display drive signal generating circuit 60.

The time data for the 1-minute, 10-minutes, 1-hour and 10-hours digits produced from the time measuring circuit 40 are also coupled to a digit selection circuit 72. The digit selection circuit 72 include four clocked inverter sets 74, 76, 78 and 80 each consisting of four clocked inverters which receive the respective time data. Clocked inverters $74_1$, $76_1$, $78_1$ and $80_1$ in the individual sets, which receive time data for bit $a_1$ in the individual digits, have their output terminals commonly connected, with the common juncture connected to a time information output terminal $82_1$. Similarly, clocked inverters $74_2$ to $80_2$, $74_3$ to $80_3$ and $74_4$ to $80_4$ in the individual sets receiving respective time data for bits $a_2$, $a_3$ and $a_4$ in the individual digits have their output terminals commonly connected for the individual bits, with the individual common junctures connected to respective time data output terminals $82_2$, $82_3$ and $82_4$. Time information produced from the time data output terminals $82_1$ to $82_4$ is supplied to data input terminals of a microprocessor 84.

The microprocessor 84 may be a 4-bit single chip microprocessor including a 2k-bit mask ROM and a 128-bit RAM. The microprocessor 84 may, for instance, comprise "TMS 1100" (a trade name) or "TMS 1300" (a trade name) microprocessor manufactured by Texas Instrument Inc. A control pulse CP produced from the microprocessor 84 is supplied to a control signal input terminal 86 of the chip and thence coupled to a one-half frequency divider 90 in the digit selection circuit 72. The output of the one-half frequency divider 90 is coupled to another one-half frequency divider 92 and also to AND gates 94 and 96, and is further coupled through an inverter 98 to AND gates 100 and 102. The output of the second frequency divider 92 is coupled to the other input terminals of AND gates 94 and 100 and also coupled through an inverter 104 to other input terminals of the AND gates 96 and 102. A start signal ST produced from the microprocessor 83 and supplied to the digit selection circuit 72 is coupled to reset terminals of the respective one-half frequency dividers 90 and 92 and also to further input terminals of the AND gates 94, 96, 100 and 102. The output pulses of the respective AND gates 94, 96, 100 and 102 are coupled to clock input terminals of the clocked inverters $74_1$ to $74_4$, $76_1$ to $76_4$, $78_1$ to $78_4$ and $80_1$ to $80_4$ in the respective sets which receive the aforementioned time data for 1-minute, 10-minutes, 1-hour and 10-hours digits respectively.

The microprocessor 84 is also connected to a plurality of input/output interfaces 108, 110, 112 and 114 via a data bus 106. For example, information from a door switch sensor and a brake lamp sensor of an automobile is supplied through the I/O interface 108, information from a brake oil sensor and a brake pad sensor is supplied through the I/O interface 110, information about outdoor temperature and radiator temperature is supplied through the I/O interface 112, and a fuel signal and a distance signal are supplied through the I/O interface 114. Instructions about the selection of the aforementioned information are given from the microprocessor 84 through a selector 116 to the I/O interfaces 108, 110, 112 and 114. The microprocessor 84 is further connected to an external RAM 120 via a bus line 121. The RAM 120 is used for temporarily storing results of various data processing operations. In case where the results of various data processing operations are temporarily stored in a RAM provided in the microprocessor at the time, for instance, when the automobile keyswitch is turned off, the microprocessor 84 constitutes an appreciable power drain on the battery. In order to prevent this, the RAM 120, which consumes less power, is provided for storing the results of data processing operations instead of the microprocessor 84 and the microprocessor 84 is disconnected from the power supply when the automobile keyswitch is turned off.

The microprocessor 84 is further connected to a BCD-7-segment decoder 118, which is in turn connected through a buffer 126 to a fluorescent tube display unit 122. The microprocessor 84 is further connected to a BCD-to-decimal decoder 124, which converts its input to corresponding decimal data which is coupled through a buffer 128 to the fluorescent tube display unit 122. In this way, various sorts of information are displayed on the display unit 122. The outputs of the decoders 118 and 124 are also coupled through an AND circuit 130 to a transistor 136, which has its collector connected to an alarm lamp 132 and an alarm buzzer 134.

The microprocessor 84 is further connected to a keyboard 138. The keyboard 138 has data keys for numerals 0 to 9, function keys F1 to F9, a fuel set key, a trip set key, a clear key and a start key. For example, the function key F1 is operated for obtaining information about fuel quantity in the automobile, F2 for fuel consumption, F3 for trip miles, F4 for remaining miles, F5 for average trip speed, F6 average miles per gallon, F7 arrive time, F8 trip time, and F9 miles to empty. The fuel set key is operated to set full gallons of fuel, and the trip set key is operated for setting trip miles. The keyed data are supplied to the microprocessor by depressing the start (ST) key. From the microprocessor 84 key sense information is supplied through the BCD-to-decimal decoder 124 to the keyboard 138, whereupon the operated keys are sensed and keyed information is supplied to the microprocessor 84.

A switch input circuit 33 has output terminals connected to respective input terminals of the time measuring circuit 40. It includes, for instance, a reset switch 35, a minutes advance switch 37, and an hours advance switch 39. These switches are adapted to be operated at the time of resetting when, for instance, effecting time correction or operating an elapsed timer. When these switches are selectively operated, the switch input circuit 33 supplies a corresponding control signal to the time measuring circuit 40.

When a control signal is supplied from the switch input circuit 33 to the time measuring circuit 40, the time measuring circuit 40 effects correction of the measured time or measurement of time elapsed after the resetting operation in accordance with the control signal.

The operation of the system of the above construction will now be described.

The clock pulse signal produced from the oscillator circuit 34 is frequency divided by the frequency divider 38 to a predetermined frequency. The output frequency signal from the frequency divider 38 is coupled to the time measuring circuit 40. The time measuring circuit 40 counts input divided-frequency pulses and progressively produces time data for 1-minute, 10-minutes, 1-hour and 10-hours digits. The produced time data for the individual digits are coupled to the display drive signal generating circuit 60.

The display drive signal generating circuit 60 decodes the input time data and produced 7-segment display drive signals, which are supplied to the display unit 70. The display unit 70 displays the present time-of-day data or a given time interval in accordance with the input 7-segment display drive instructions.

A case when the microprocessor 84 performs data processing with time data obtained in the time measuring circuit 40 will now be discussed.

Figures 4A, 4B, 4C, 4D, 4E, 4F, 4G, 4H, 4I:
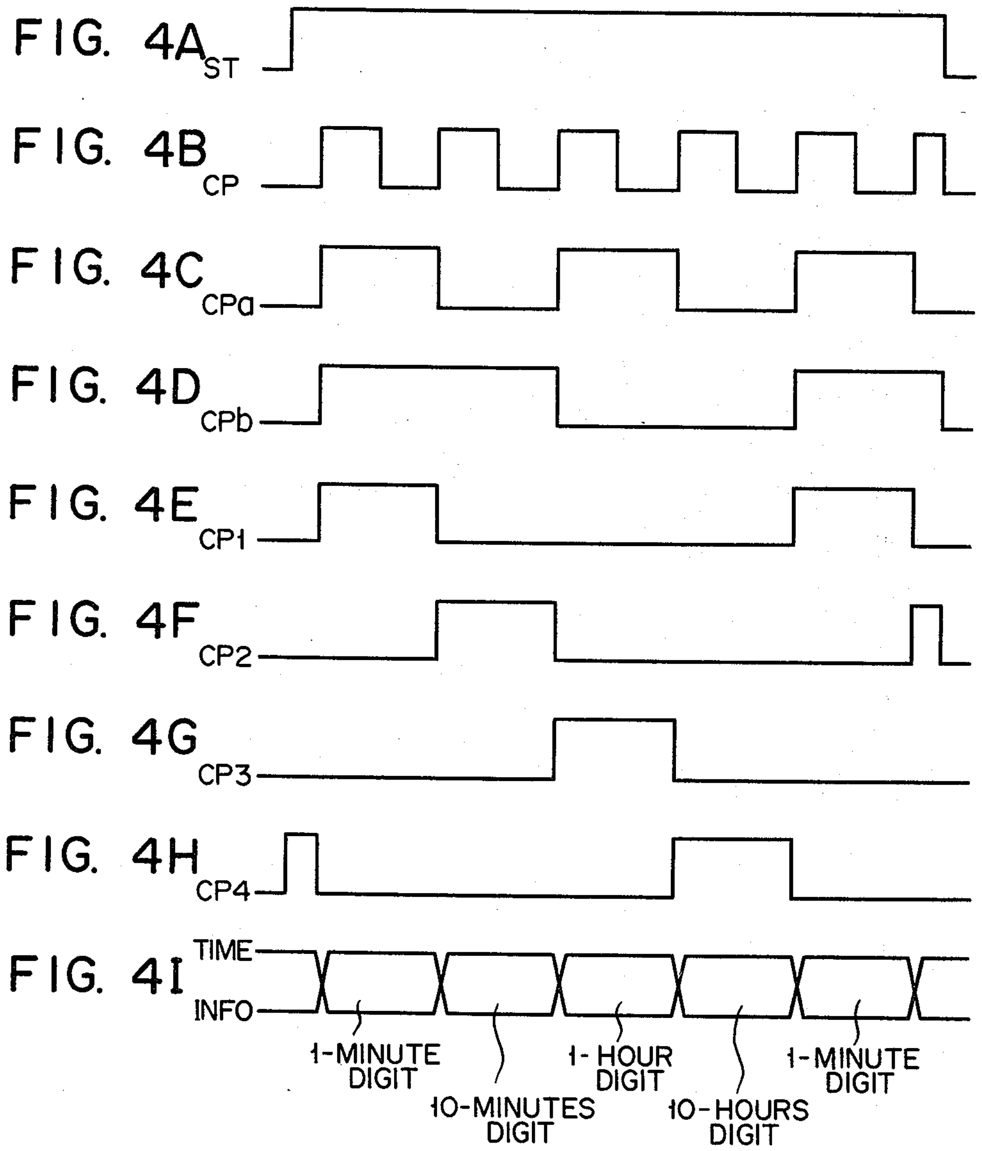
FIGS. 4A through 4I are timing charts illustrating the operation of the embodiment of FIGS. 3A through 3D.

After the rising of a start signal ST as shown in FIG. 4A, the microprocessor 84 produces successive control pulses of a constant pulse period as shown in FIG. 4B. This control pulse signal CP is coupled to the digit selection circuit 72, and the one-half frequency divider 90 frequency divides the input to produce a pulse signal CPa as shown in FIG. 4C. The other one-half frequency divider 92 frequency divides this pulse signal CPa to produce a pulse signal CPb as shown in FIG. 4D. When both the clock pulse signals CPa and CPb are at a high level, the AND circuit 94 receives high level CPb, ST and CPa signals. At the same time, the AND circuit 100 receives high level CPb and ST signals and low level CPa signal which is coupled through the inverter 98. Further, the AND circuit 96 receives low level CPb signal and high level ST signal, and the AND circuit 102 receives low level CPb and CPa signals and high level ST signal. Consequently, the AND circuit 94 produces a pulse signal CP1 as shown in FIG. 4E. Likewise, with the signal CPa at low level and the signal CPb at high level a signal CP2 as shown in FIG. 4F is obtained, with the signal CPa at high level and the signal CPb at low level a signal CP3 as shown in FIG. 4G is obtained, and with the signals CPa and CPb both at low level a signal CP4 as shown in FIG. 4H is obtained. When the pulse signal CP1 is coupled to the clock input terminals of the clocked inverters $\mathbf{74_1}$ to $\mathbf{74_4}$ these inverters produce time data for the 1-minute digit constituted by four bits $a_1$ to $a_4$. When the pulse signal CP2 is coupled to the clock input terminals of the clocked inverters $\mathbf{76_1}$ to $\mathbf{76_4}$, they produce time data for the 10-minutes digit. When the pulse signal CP3 is coupled to the clock input terminals of the clocked inverters $\mathbf{78_1}$ to $\mathbf{78_4}$, they produce time data for the 1-hour digit. When the pulse signal CP4 is coupled to the clock input terminals of the clocked inverters $\mathbf{80_1}$ to $\mathbf{80_4}$, they produce time data for the 1-hour digit. In this way, time data for the 1-minute, 10-minutes, 1-hour and 10-hours digits are progressively produced from the respective sets of clocked inverters $\mathbf{74_1}$ to $\mathbf{74_4}$, $\mathbf{76_1}$ to $\mathbf{76_4}$, $\mathbf{78_1}$ to $\mathbf{78_4}$ and $\mathbf{80_1}$ to $\mathbf{80_4}$, as shown in FIG. 4I.

Now, the operation of the microprocessor 84 for obtaining the average trip speed of the automobile when external information concerning the distance covered by the automobile is supplied to the I/O interface 114 will be discussed.

The microprocessor 84 first supplies the control signals ST and CP to the digit selection circuit 72 for obtaining information about the present time. With the control signals ST and CP coupled to it, the digit selection circuit 72 produces time data for the 1-minute to 10-hours digits representing the prevailing time, as mentioned earlier. It is assumed that the prevailing time is thirteen minutes past one, i.e., "1:13". This time data is transferred through bus line to the microprocessor 84 and stored once in a memory in the microprocessor 84. After the time data is stored, the microprocessor 84 ceases the control pulse signal CP, and then it inverts the signal ST to low level. With the low level ST signal coupled to the digit selection circuit 72, the output terminals thereof are rendered to be in a high impedance state, that is, the digit selection circuit 72 is electrically disconnected from the bus line.

Then, the microprocessor 84 progressively adds distance data transferred to it through the I/O interface 114 and bus line 106 to obtain the total distance. Subsequently, at a certain instant the microprocessor 84 supplies the start signal ST and control pulse signal CP again to the digit selection circuit 72, Thereupon, the digit selection circuit 72 produces the time data at that instant, which is assumed to be "01:17". This time information is transferred to the microprocessor 84 and temporarily stored therein as mentioned earlier. Before storing the second time information, the microprocessor 84 stops the afore-mentioned distance adding operation and stores the total distant obtained at this moment. Further, the microprocessor 84 executes a subtraction operation with the time data stored for the first and second times, namely "01:17"–"01:13", to obtain a result "00:04", i.e., four minutes, and then it divides the total distance by this time interval value to obtain the average trip speed. The average trip speed thus obtained is either transferred to an external unit through an I/O interface, or is transferred to the display unit 70 for display.

As has been shown, with this embodiment the digit selection circuit 72 is adapted such that its output terminals are held in a high impedance state and electrically separated from the bus line and that it is permitted to send out time data to the bus line when it is commanded by the microprocessor 84 to supply the time data thereto so that the clock LSI circuit device 32 shown enclosed by the dashed line and the microprocessor 84 can be simply connected to each other.

In addition, since time information can be provided directly from the digit selection circuit 72 and neither a separate circuit nor processing capacity is needed in the microprocessor 84 for determining a time-of-day data, it is possible to simplify the construction of the overall system where the device of the instant embodiment is combined with the microprocessor 84 and permits extremely high processing efficiency thereof.

Figure 5:
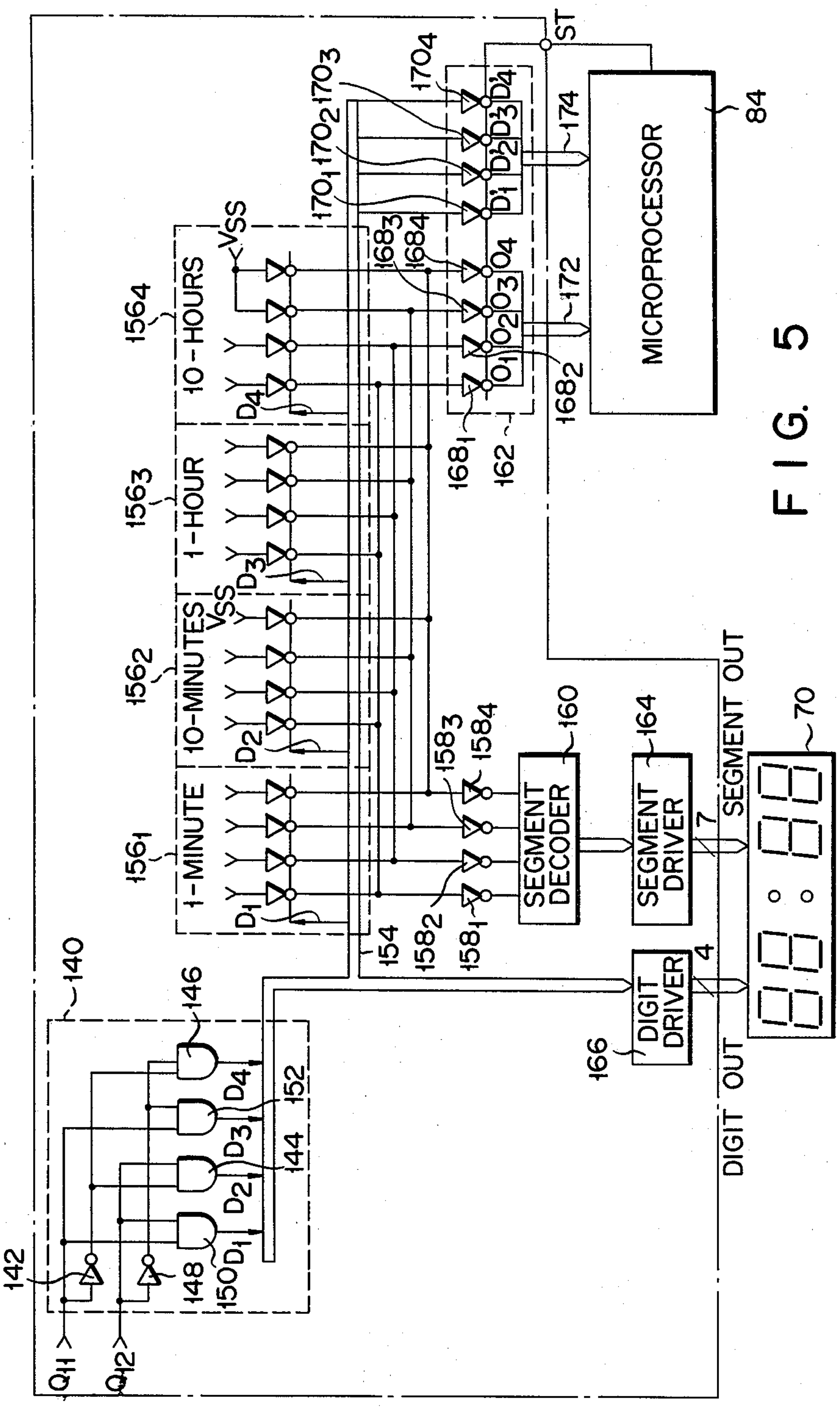
FIG. 5 is a schematic showing another embodiment of the invention.

FIG. 5 is a schematic representation of another embodiment of the invention.

While the preceding embodiment of FIG. 3 has been of a so-called static type in which the time data for 1-minute to 10-hours digits obtained in the time measuring circuit 40 are supplied in parallel or simultaneously to the display drive signal generating circuit 60 and digit selection circuit 72, the FIG. 5 embodiment is of a dynamic type where the time data obtained for the individual digits are transferred sequentially one digit after another on a time division basis. In the Figure, a portion enclosed by a broken line is constituted by a single chip, and it has the same oscillator circuit 34, frequency divider circuit 38, switch input circuit 33 and time measuring circuit 40 as in the preceding embodiment of FIG. 3, the illustration of these circuits being omitted here.

As has been described earlier in connection with FIG. 3, the oscillator circuit 34 produces the oscillation frequency signal coupled as clock pulse signal to the frequency divider 38 for frequency division. The output frequency signal from the frequency divider 38 is coupled to the time measuring circuit 40 and also to a timing signal generating circuit 140. More particularly, the frequency divider circuit 38 supplies, for instance, a signal $Q_{11}$ as shown in FIG. 6K to the timing signal generating circuit 140. This signal is coupled to one input terminal of each of AND circuits 150 and 152 and also coupled through an inverter 142 to one input terminal of each of AND circuits 144 and 146. The frequency divider circuit 38 also supplies a signal $Q_{12}$ as shown in FIG. 6L, which is coupled to the other input terminals of the AND circuits 150 and 144 and also coupled through an inverter 148 to the other input terminals of the AND circuits 152 and 146. The AND circuits 150, 144, 152 and 146 produce respective digit pulse signals $D_1$ to $D_4$ as shown in FIGS. 6A to 6D, which are coupled through a data bus 154 to gate circuits $156_1$ to $156_4$. The gate circuits $156_1$ to $156_4$ progressively produce time data for the 1-minute to 10-hours digits as they receive the respective digit pulse signals $D_1$ to $D_4$. The time data produced from the gate circuits $156_1$ to $156_4$ are coupled through inverters $158_1$ to $158_4$ to a segment decoder 160 and also coupled directly to a digit selection circuit 162. The segment decoder 160 may use, for instance, "CD4511B" circuits by RCA. The output of the segment decoder 160 is coupled to a 7-segment driver 164. The output signal of the segment driver 164 is supplied to a display unit 70, which is connected to the clock LSI circuit device.

Figure 1:
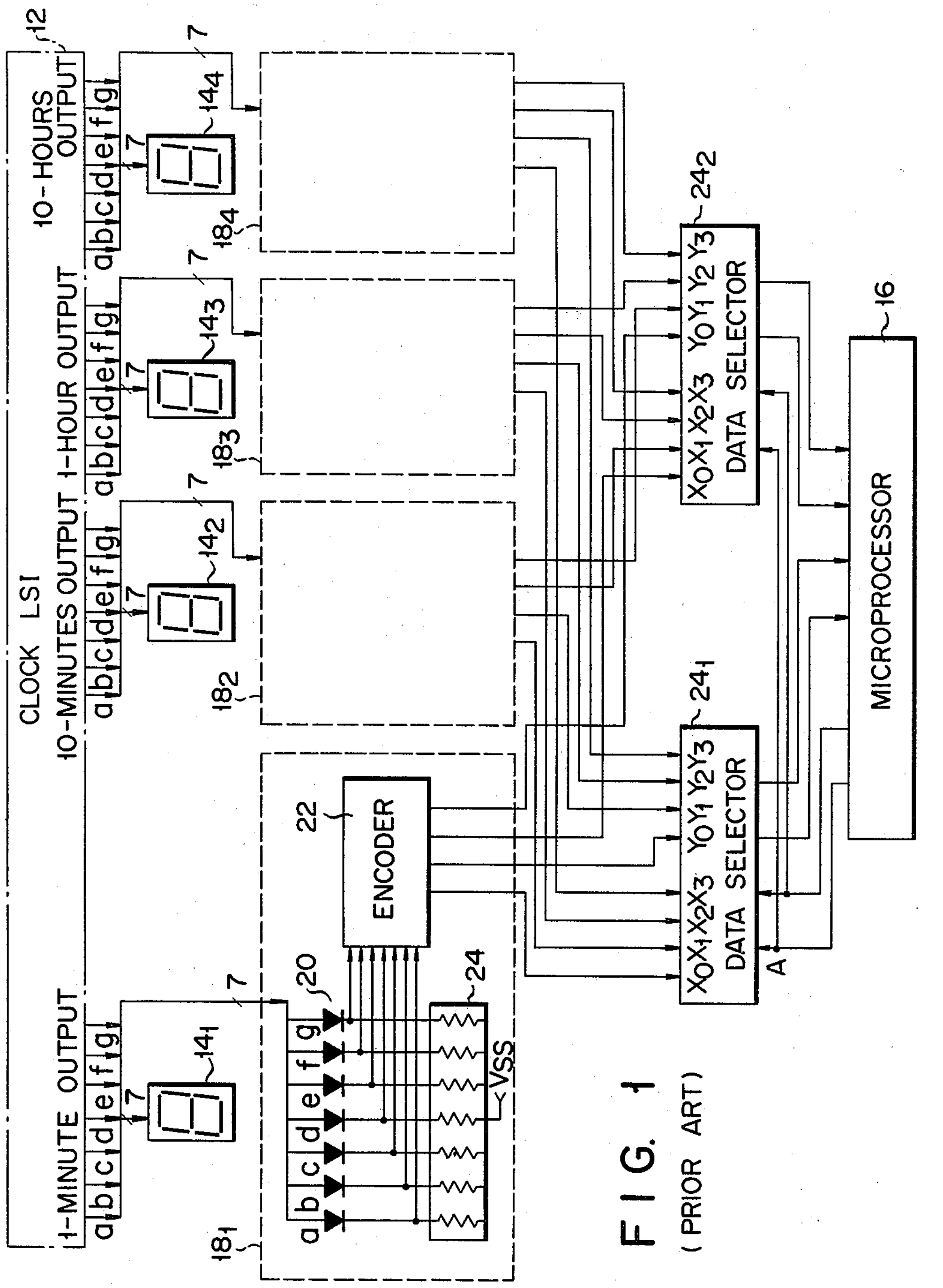
F I G. 1 (PRIOR ART)
FIG. 1 is a schematic showing an example of the connection between a clock integrated circuit device and a microprocessor as central processing unit in the prior art.
Figure 2:
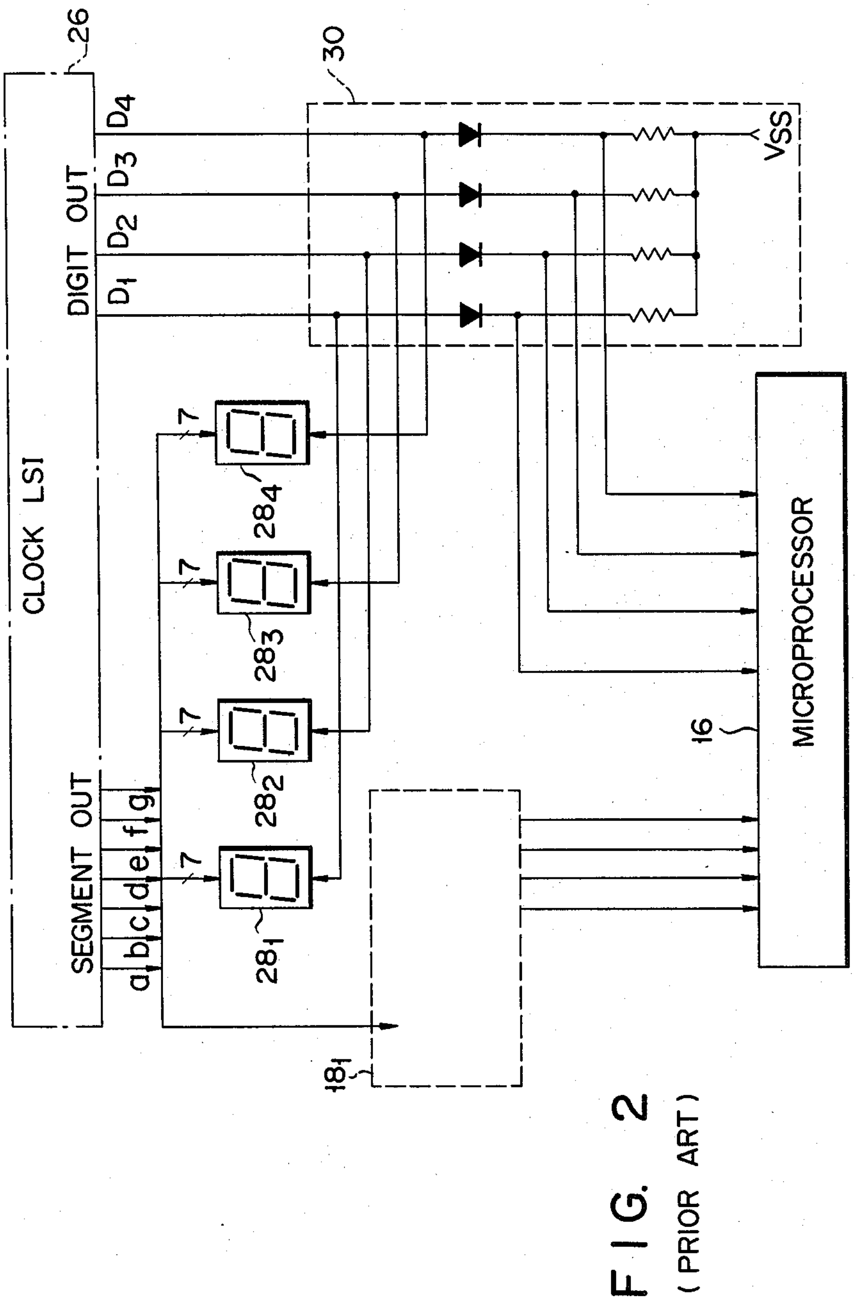
FIG. 2 (PRIOR ART)
FIG. 2 is a schematic showing another example of the connection between a clock integrated circuit device and a microprocessor as central processing unit in the prior art.

The display unit 70 displays the time data obtained in the time measuring circuit 40 (as shown in FIG. 1) as dynamic display according to the output signal of the segment driver 164.

The digit pulse signals $D_1$ to $D_4$ produced from the timing signal generating circuit 140 are also coupled to a digit driver 166, which produces a digit out signal which is supplied to the display unit 70.

The digit selection circuit 162 includes four clocked inverters $168_1$ to $168_4$ as a set, and the time data for the 1-minute to 10-hours digits each consisting of four bits $O_1$ to $O_4$, produced from the respective gate circuits $156_1$ to $156_4$, are coupled to the clocked inverters $168_1$ to $168_4$ each bit to each. It also includes another set of clocked inverters $170_1$ to $170_4$, to which the respective digit pulses $D_1$ to $D_4$ produced from the timing signal generating circuit 140 are coupled. The output terminals of the clocked inverters $168_1$ to $168_4$ and $170_1$ to $170_4$ are connected to the microprocessor 84. Thus, the clocked inverters $168_1$ to $168_4$ supply respective output signals $O_1$ to $O_4$ as shown in FIG. 6J to the microprocessor 84. Also, the clocked inverters $170_1$ to $170_4$ supply signals $D'_1$ to $D'_4$ as shown in FIGS. 6F to 6I to the microprocessor 84. The microprocessor 84 supplies a start control signal ST to the clock input terminals of the clocked inverters $168_1$ to $168_4$ and $170_1$ to $170_4$.

With the above construction, the microprocessor 84 does not usually provide the control pulse ST, so that the clocked inverters $168_1$ to $168_4$ and $170_1$ to $170_4$ are held inoperative, that is, all of the output terminals of the clocked inverters $168_1$ to $168_4$ and $170_1$ to $170_4$ are held in a high impedance state. This means that the digit selection circuit is separated from bus lines 172 and 174 to permit various data processing operations to be performed in the microprocessor 84.

A case when the microprocessor 84 performs data processing with time data obtained in the time measuring circuit 40 will now be described.

Figures 6A, 6B, 6C, 6D, 6E:
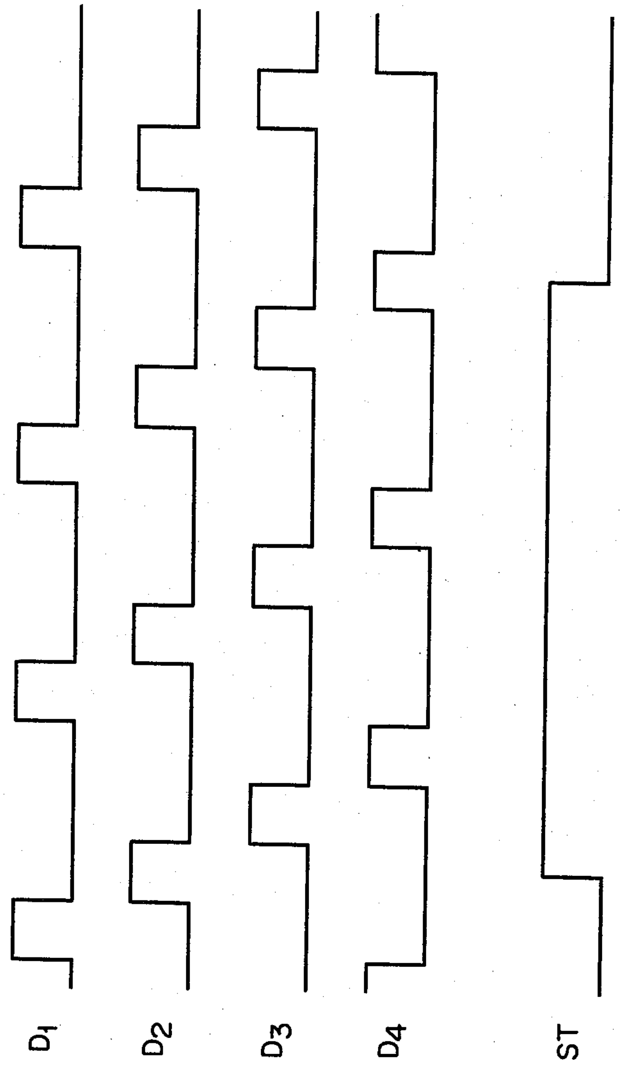
FIGS. 6A through 6L are timing charts illustrating the operation of the embodiment of FIG. 5.
Figures 6F, 6G, 6H, 6I, 6J, 6K, 6L:
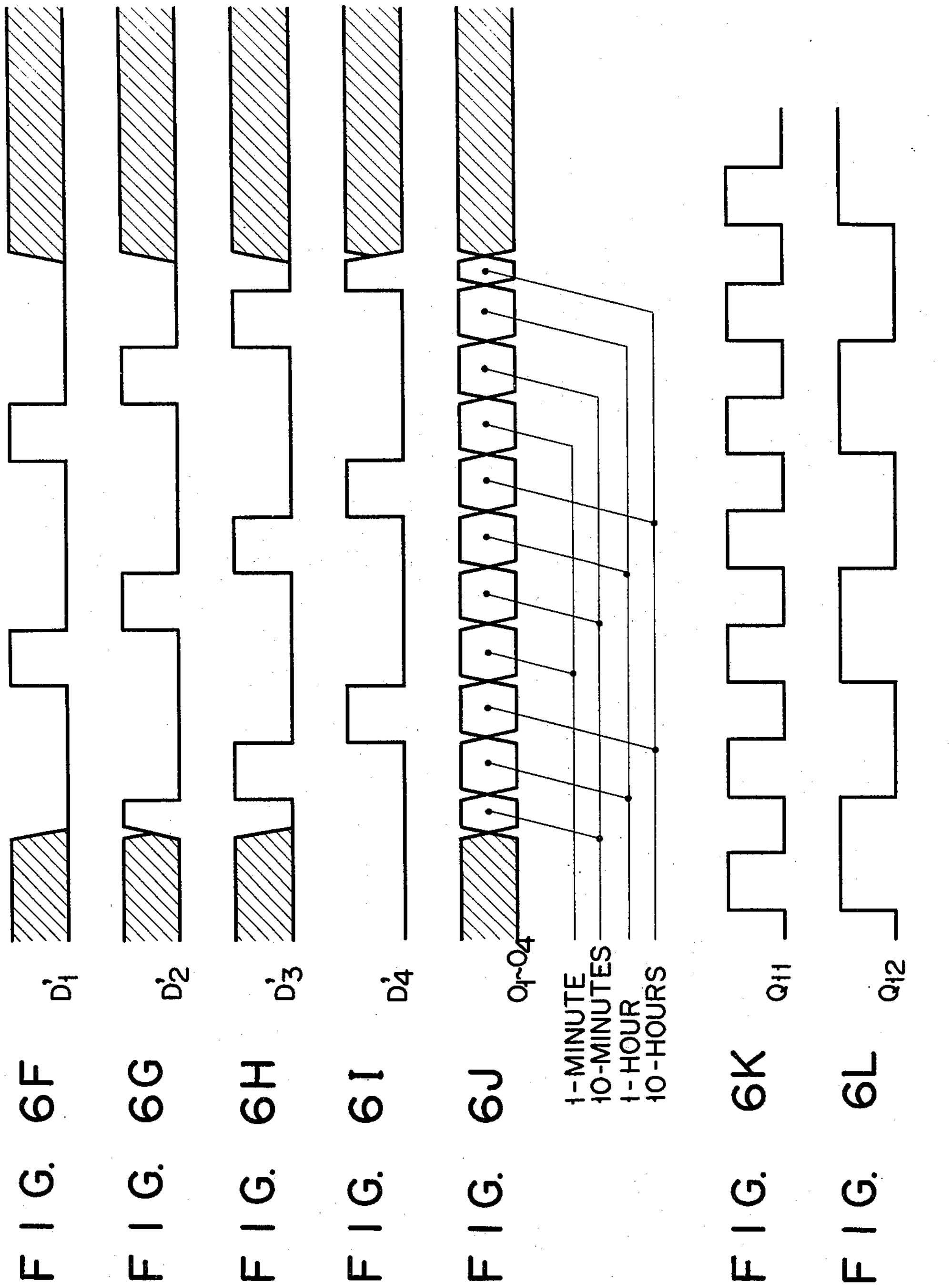

The microprocessor 84 first produces the high level start control signal ST as shown in FIG. 6E. During the high level period of the control signal ST the clocked inverters $168_1$ to $168_4$ and $170_1$ to $170_4$ in the digit selection circuit 162 are all operative.

When the digit pulse $D_1$ is produced from the timing signal generating circuit 140, the gate circuit $156_1$ passes the time data for the 1-minute digit produced from the time measuring circuit 40. This time data is supplied through the clocked inverters $168_1$ to $168_4$ to the microprocessor 84. At this time, the digit pulse $D'_1$ is supplied through the inverter $170_1$ to the microprocessor 84, so that the microprocessor 84 determines that the supplied time data is for the 1-minute digit and temporarily stores it in an RAM (not shown) contained in the chip. Likewise, as the digit pulses $D_2$, $D_3$ and $D_4$ are produced from the timing signal generating circuit 140, the gate circuits $156_2$, $156_3$ and $156_4$ successively pass the time data for the respective 10-minutes, 1-hour and 10-hours digits produced from the time measuring circuit 40, and these time data are successively supplied through the clocked inverters $168_1$ to $168_4$ in the digit selection circuit 162 to the microprocessor 84. Concurrently with the digit pulses $D_2$, $D_3$ and $D_4$ the digit pulses $D'_2$, $D'_3$ and $D'_4$ are successively supplied through the respective clocked inverters $170_2$, $170_3$ and $170_4$, so that the microprocessor 84 determines that the supplied time data are respectively for the 10-minutes, 1-hour and 10-hours digits and temporarily stores them in the RAM provided in itself. Subsequently, the microprocessor 84 performs data processing in the manner as described earlier in connection with the previous embodiment of FIG. 3.

Again with this embodiment the digit selection circuit 162 is adapted such that its output terminals are held in a high impedance state and separated from the bus lines 172 and 174 and that it is permitted to transfer time data through the bus line 172 to the microprocessor 84 when the transfer of the time data is commanded by the microprocessor 84, so that the clock LSI circuit device enclosed by the broken line and the microprocessor 84 can be physically simply connected to each other.

In addition, since like the previous embodiment the time information is provided directly from the digit selection circuit, it is possible to simplify the construction of the overall system in case when the device of this embodiment is combined with the microprocessor 84 and also obtain an extremely high processing efficiency thereof.

Figure 7:
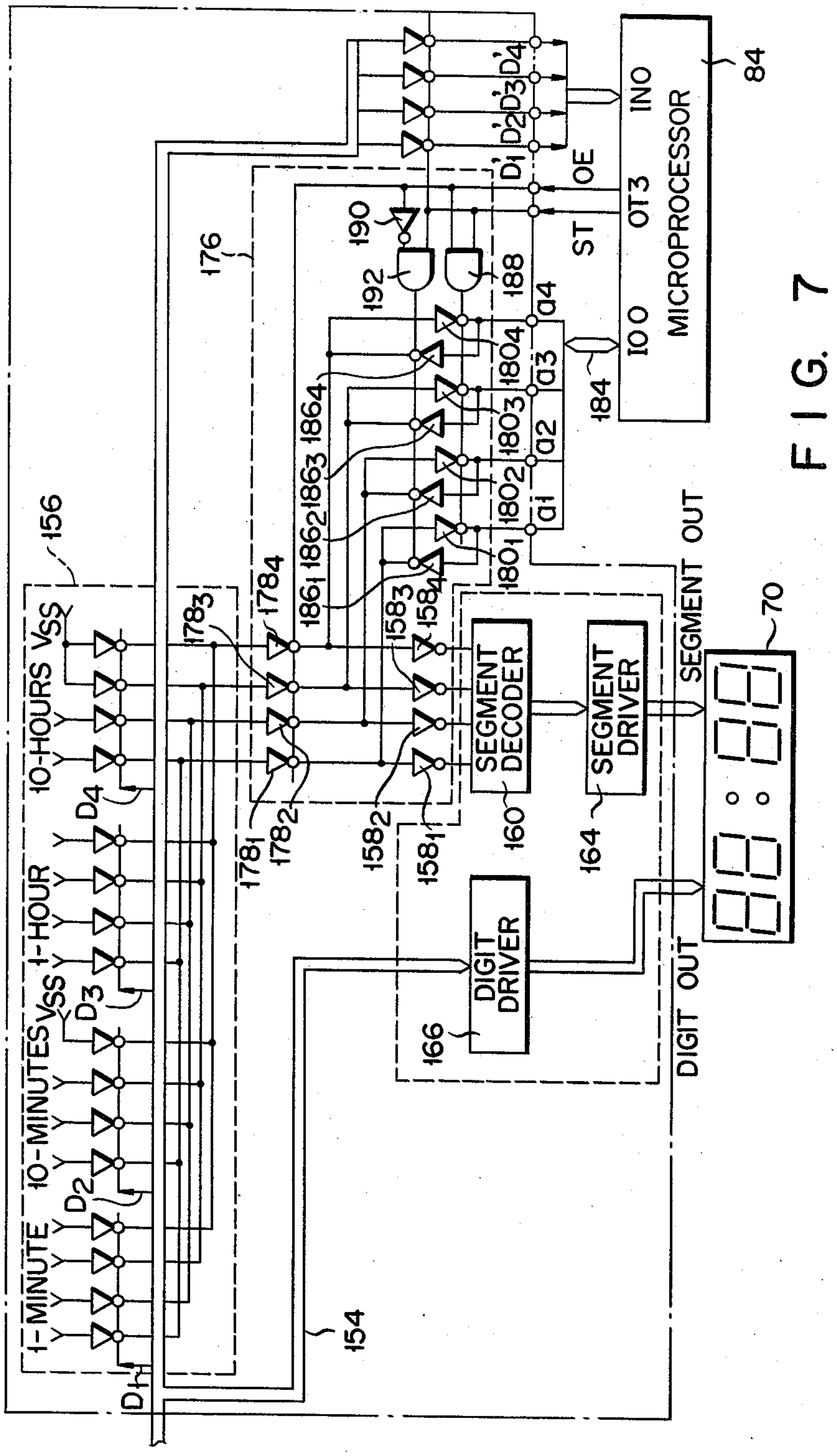
FIG. 7 is a schematic showing a further embodiment of the invention.

FIG. 7 shows a further embodiment of the invention. In the Figure, like parts as those in FIG. 3 are designated by like reference numerals, and their description is omitted.

While the previous embodiment of FIG. 3 has had a display unit 70 for displaying time information and a display unit 122 for displaying the result of data processing in the microprocessor 84, in this embodiment the time information and information about the result of data processing are both displayed on a single display unit 70. This embodiment has the same oscillator 34, frequency divider 38, switch input circuit 33, time measuring circuit 40 and timing signal generating circuit 140 as in those shown in FIG. 3 or 5, and the illustration of these circuits are omitted.

This embodiment has a switching circuit 176 with input terminals thereof connected to respectively corresponding output terminals of a digit selection circuit 156, which is equivalent to the gate circuits $156_1$ to $156_4$ as a set in the preceding embodiment of FIG. 5. This switching circuit 176 is connected to the microprocessor 84 and also to connected through a segment decoder 160 and a segment driver 164, which decoder and driver constitute a display driver, to a display unit 70. The timing signal generator 140 is also connected through a data bus 154 to a digit driver 166, which has its output end connected to the display unit 70. Inverters $158_1$ to $158_4$, segment decoder 160, segment driver 164 and digit driver 166 are the same as those described earlier in connection with the embodiment of FIG. 5, so their detailed description is omitted here.

The bit signals $a_1$ to $a_4$ of the time data for the individual digits produced from the digit selection circuit 156 are coupled to respective clocked inverters $178_1$ to $178_4$. The output terminals of the clocked inverters $178_1$ to $178_4$ are connected to the respective input terminals of the inverters $158_1$ to $158_4$ and also to those of clocked inverters $180_1$ to $180_4$. The clocked inverters $180_1$ to $180_4$ are connected through an input/output bus 184 to the microprocessor 84.

Further clocked inverters $186_1$ to $186_4$ are connected in parallel with and in opposite polarity relation to the respective clocked inverters $180_1$ to $180_4$. A control signal OE produced from the microprocessor 84 is supplied to the input terminals of an AND gate 188, an inverter 190 and the clocked inverters $178_1$ to $178_4$. The output of the inverter 190 is coupled to an AND gate 192.

A control signal ST produced from the microprocessor 84 is supplied to the other input terminals of the two AND gates 188 and 192. The output of the AND gate 188 is coupled to the clock input terminals of the clocked inverters $180_1$ to $180_4$, and the output of the AND gate 192 is supplied to the clock input terminals of the clocked inverters $186_1$ to $186_4$.

The clocked inverters $178_1$ to $178_4$, $180_1$ to $180_4$ and $86_1$ to $186_4$ are adapted such that with a high level input signal coupled to their clock input terminal they act to invert the input signal and produce an inversion output.

The operation of the system of the above construction will now be described.

Figures 8G, 8H, 8I, 8J, 8K, 8L:
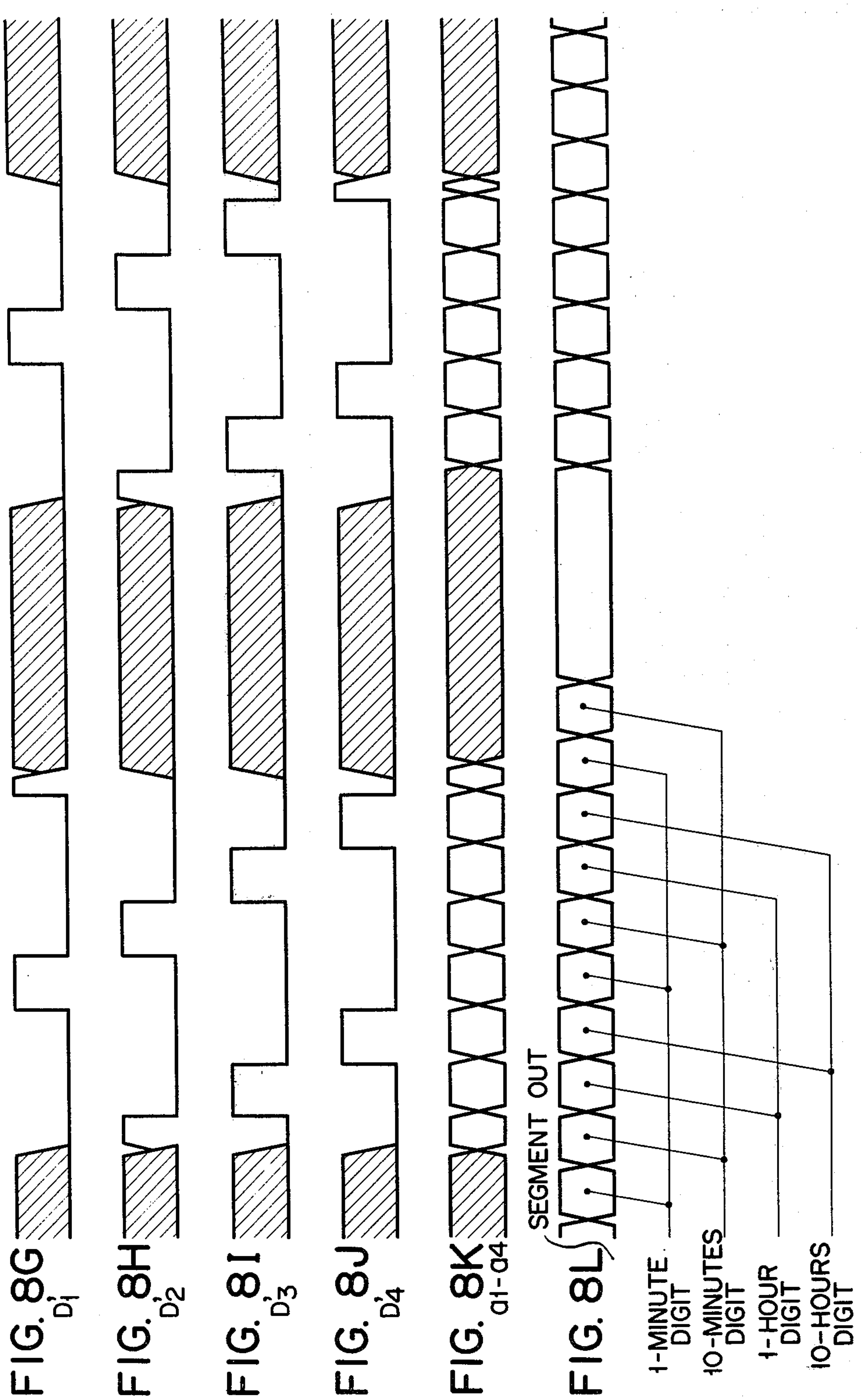

First, the operation in case when displaying the present time-of-day data or a desired period of elapsed time on the display unit 70 will be discussed. In this case, the microprocessor 84 holds the control signals OE and ST respectively at high and low levels as shown in FIGS. 8F and 8E. With the control signals OE and ST respectively at high and low levels, the outputs of the AND gates 188 and 192 in the switching circuit 176 are both at low level. Consequently, the four clocked inverters $178_1$ to $178_4$, which receive the signal OE at high level at this time, are rendered operative. Thus, the time data for the 1-minute to 10-hours digits each consisting of four bits $a_1$ to $a_4$, as shown in FIG. 8K, which are successively produced from the digit selection circuit 156, are inverted by the respective clocked inverters $178_1$ to $178_4$ and are inverted once again by the respective four inverters $158_1$ to $158_4$ before being coupled to the segment decoder 160. At this time, the present time-of-day data or a given period of time is determined as the time measuring circuit counts successive output pulses from the frequency divider circuit, and the time information thus obtained is successively coupled through the switching circuit 176 to the segment decoder 160. The segment decoder 160 and segment driver 164 convert the input time data to corresponding 7-segment display drive signals. With these signals supplied to the display unit 70, it displays the prevailing time or given period of time in the successive 1-minute to 10-hours digits, as shown in FIG. 8L.

Figure 9A:
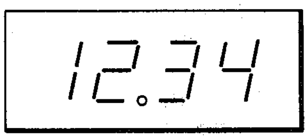
FIGS. 9A through 9E are views showing display states illustrating the operation of the embodiment of FIG. 7.

FIG. 9A shows a case when the prevailing time-of-day data "12:34" is displayed on the display unit 70.

Now, a case of displaying information about the trip distance, consumed fuel quantity or fuel consumption on the display unit will be discussed. In this case, the microprocessor 84 successively produces the relevant data from the lowest place digit in synchronism to the digit pulses $D_1$ to $D_4$, while holding the control signal OE at low level and intermittently rendering the control signal ST to be at high level for every digit data output period. With the control signals OE and ST both at low level, the two AND gates 188 and 192 in the switching circuit 176 both provide low level output. Thus, the clocked inverters $180_1$ to $180_4$ and $186_1$ to $186_4$ are inoperative, and so are the clocked inverters $178_1$ to $178_4$ which receive the signal OE as clock input. When the control signal ST is inverted to high level, the outputs of the AND gates 192 are also inverted to high level, and during this high level period the four clocked inverters $186_1$ to $186_4$ are held operative. In other words, every time data for one digit is supplied from the microprocessor 84 the four clocked inverters $186_1$ to $186_4$ function to invert their inputs, and their outputs are further inverted by the inverters $158_1$ to $158_4$ before being coupled to the segment decoder 160. The segment decoder 160 decodes the input data, according to which the segment driver 164 produces a corresponding display drive signal which is in turn supplied to the display unit 70 for display.

Figure 9B:
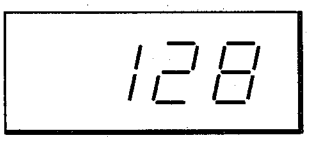
Figure 9C:
Figure 9D:
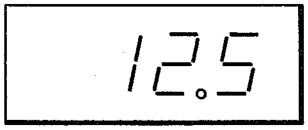
Figure 9E:

FIGS. 9B, 9E and 9D respectively show cases when a trip distance of 128 km, a consumed fuel quantity of 38.6 l and a fuel consumption of 12.5 km/l are displayed on the display unit 70.

Now, a case of causing the microprocessor 84 to perform operation on time data supplied thereto from the time measuring circuit for deriving information about the average trip speed and displaying this information on the display unit 70 will be discussed. In this case, the microprocessor 84 first holds the control signal OE at high level, and also it holds the control signal ST at high level for every one digit output period, during which time data for one digit is output from the digit selection circuit 156. With the control signals OE and ST both at high level, the clocked inverters $178_1$ to $178_4$ and $180_1$ to $180_4$ in the switching circuit 176 provide the inverting action, so that the time data from the time measuring circuit 40 are successively supplied through the switching circuit 176 to the microprocessor 84. The microprocessor 84 stores the supplied time information. It is assumed that this time information represents "01:32". After storing this information, the microprocessor 84 supplies a selection signal SL through the selector 116 (shown in FIG. 3C) to the input/output interface circuit 114, thus causing the input/output interface circuit 114 to transfer a pulse signal $P_R$ representing the trip distance to it. The microprocessor 84 then counts the successive input pulses $P_R$ to obtain trip distance data. Subsequently, it stops the operation of counting the pulses $P_R$ and stores the trip distance data immediately before the stopping. After storing the trip distance data, it again holds the control signal OE at high level and also holds the control signal ST for every digit time data output period, during which time data for one digit is output from the digit selection circuit 156. Thus, the time data from the time measuring circuit 40 are successively supplied through the switching circuit 176 to the microprocessor 84 and then stored therein in the manner as mentioned earlier. It is assumed that the time information at this time is "01:43". Then, the microprocessor 84 performs subtraction of the two stored time data one from the other to obtain an elapsed time of "00:11", i.e., 11 minutes. Thereafter, it divides the stored trip distance data by the elapsed time "00:11" to obtain the average trip speed. When the average trip speed is obtained in this way, the microprocessor 84 progressively outputs this information from the lowest place digit in synchronism to the digit pulses $D_1$ to $D_4$, while also holding the control signal OE at low level and holding the control signal ST at high level for every digit output period, during which each digit of information is output. Afterwards, like the afore-mentioned case of displaying the trip distance and so forth the average trip speed data are successively coupled digit by digit to the segment decoder 160 and successively displayed from the least significant digit on the display unit 70. FIG. 9E shows a case when an average trip speed of 25.5 km/h (or mile/h) is displayed on the display unit 70.

With this embodiment, in which the switching circuit 176 is provided to selectively supply either time data from the time measuring circuit 40 or time data from the microprocessor 84 for the display, only a single display unit 70 is needed, so that the system as a whole can be inexpensively manufactured. In addition, since the time data from the time measuring circuit 40 is supplied through the switching circuit 176 to the microprocessor 84, the microprocessor 84 need not perform such operation as determination of a time-of-day data, so that its processing efficiency can be increased.

While the display of the trip distance, consumed fuel quantity, fuel consumption and average trip distance as well as present time-of-day data and given time interval has been discussed in connection with the above embodiment, it is of course to be understood that any information produced after data processing in the microprocessor 84 can be displayed.

Also, while in the preceding embodiments of FIGS. 3, 5 and 7 the time information obtained from the time measuring circuit has consisted of only four digits, namely 1-minute, 10-minutes, 1-hour and 10-hours digits, for the sake of brevity of description, this is by no means limitative, and it will be apparent that systems dealing with time data consisting of six digits, namely, 1-second, 10-seconds, 1-minute, 10-minutes, 1-hour and 10-hours digits or consisting of a suitable combination of these digits can be readily obtained in accordance with the invention.

Figure 19:
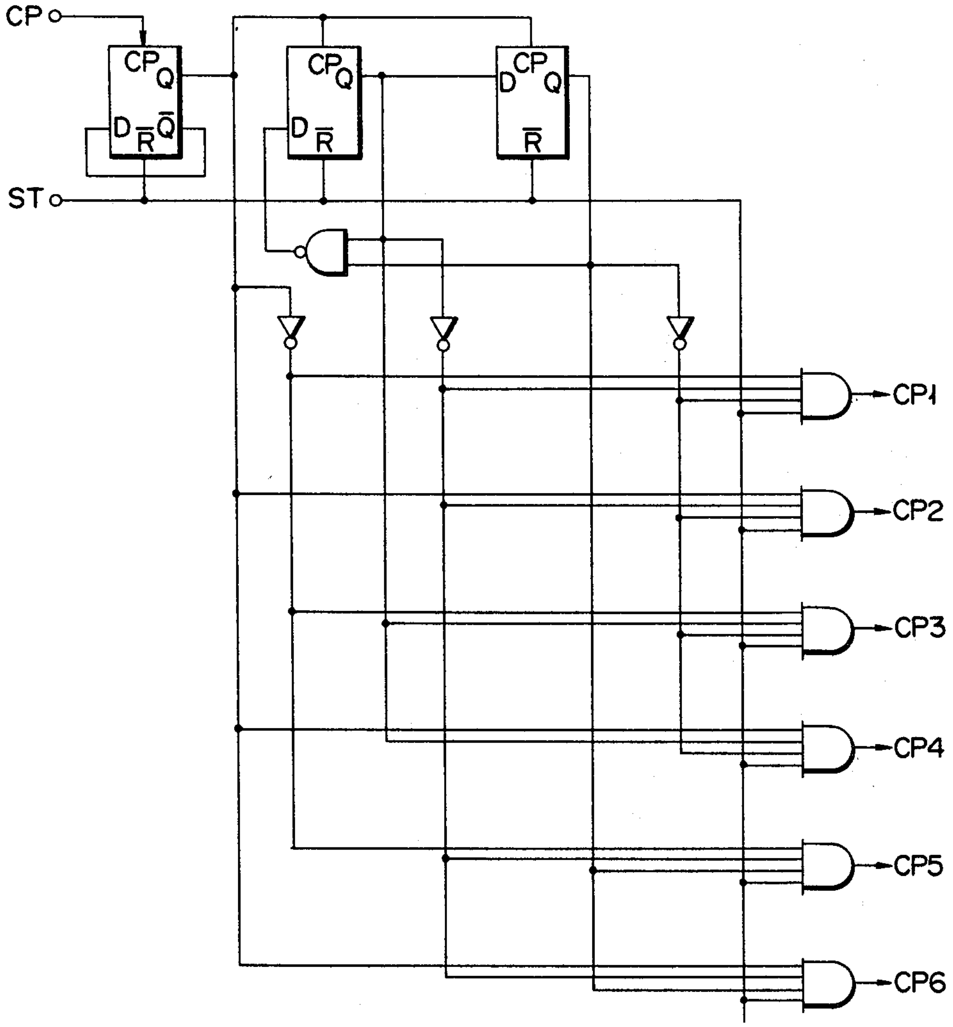
FIG. 19 is a schematic showing a digit selection circuit having 6 digits, namely one-second, ten-seconds, one-minute, ten-minutes, one-hour and ten-hours digits.

FIG. 19 shows an example of the digit selection circuit, which provides time data consiting of six digits. FIGS. 20A to 20H show timing charts illustrating various signals in this case. The operation of this circuit is essentially the same as that of the four-digit circuit in the embodiment of FIG. 3, so that its description is omitted.

Figure 10:
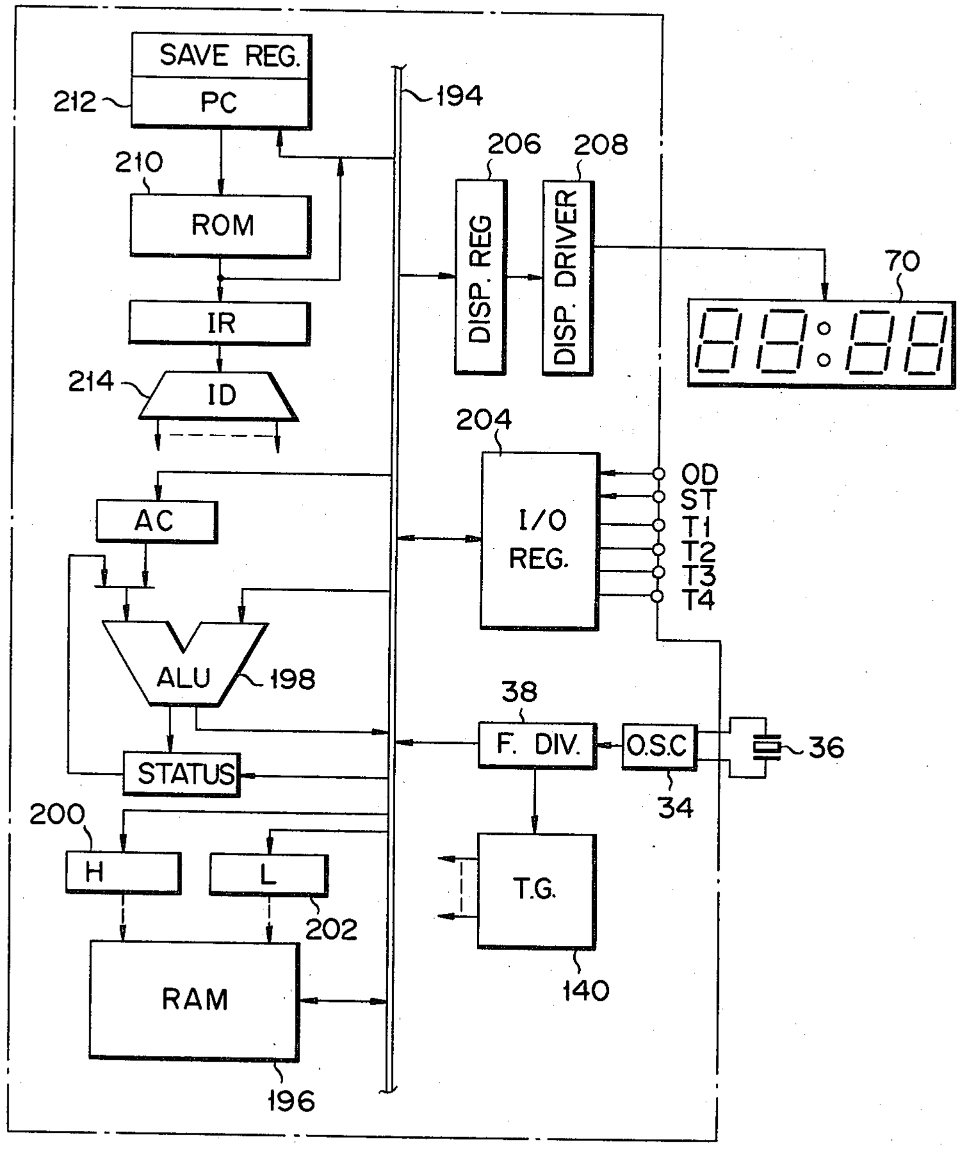
FIG. 10 is a schematic showing a still further embodiment of the Invention.

FIG. 10 is a block diagram showing a still further embodiment of the invention. In the Figure, like parts as those in FIGS. 3, 5 and 7 are designated by like reference numerals, and their description is omitted.

A portion enclosed by a broken line is a one-chip clock LSI integrated circuit device.

The clock pulse signal produced from the oscillator circuit 34 is coupled to the frequency divider 38. The frequency divider frequency divides the input clock pulse signal to produce one-second pulses, which are supplied via a bus line 194 to an RAM 196. The RAM 196 successively stores the input one-second pulses. The contents of the RAM 196 are read out from predetermined locations thereof according to address data set in H and L registers 200 and 202, and supplied to an arithmetic logic unit (ALU) 198. The ALU 198 performs data processing with the data supplied from the RAM 196 to obtain the time-of-day data consisting of 1-minute, 10-minutes, 1-hour and 10-hours digits each consisting of four bits $a_1$ to $a_4$ and also obtain calendar data such as ante or post meridian and date corresponding to the day of month. The time-of-day data consisting of 1-minute to 10-hours digits and also calendar data, obtained from the ALU 198, are stored in predetermined locations in the RAM 196.

An input/output register 204 is connected to the bus line 194. It receives control signals OD and ST produced from the microprocessor 84 (shown in FIG. 3), and then it stores data read out from the RAM 196. Thereafter, it outputs the data from input/output terminals $T_1$ to $T_4$ connected to a bus line which is connected to the microprocessor 84, and it temporarily stores data outputted from the microprocessor 84 and supplies to it through the input/output terminals $T_1$ to $T_4$. The output data from the microprocessor 84, having been temporarily stored in the input/output register 204, is transferred through the bus line 194 to the RAM 196 and stored therein at given locations thereof. The time-of-day data entered into the RAM 196 and output data from the microprocessor 84 are read out at a predetermined timing, and the read-out data are supplied through the bus line 194 to a display register 206 and stored therein. The data stored in the dislay register 206 is transferred to a display driver 208. The display driver 208 decodes the input data to obtain corresponding display signal and amplifies this signal. The amplified display signal is supplied to a display unit 70. The display unit 70 displays information represented by the display signal supplied from the display driver 208. A ROM 210 stores a series of microprograms for controlling the RAM 196, ALU 198 and input/output register 204, and its address specification is made according to the output of a program conter 212. The ROM 210 is adapted such that microprograms stored in its memory areas at addresses specified by the program counter 212 are read out, and the read-out instructions are supplied to an instruction decoder 214. The instruction decoder 214 decodes the supplied instructions to produce corresponding control signals, which are supplied to the RAM 196, ALU 198 and input/output register 204.

Figure 11:
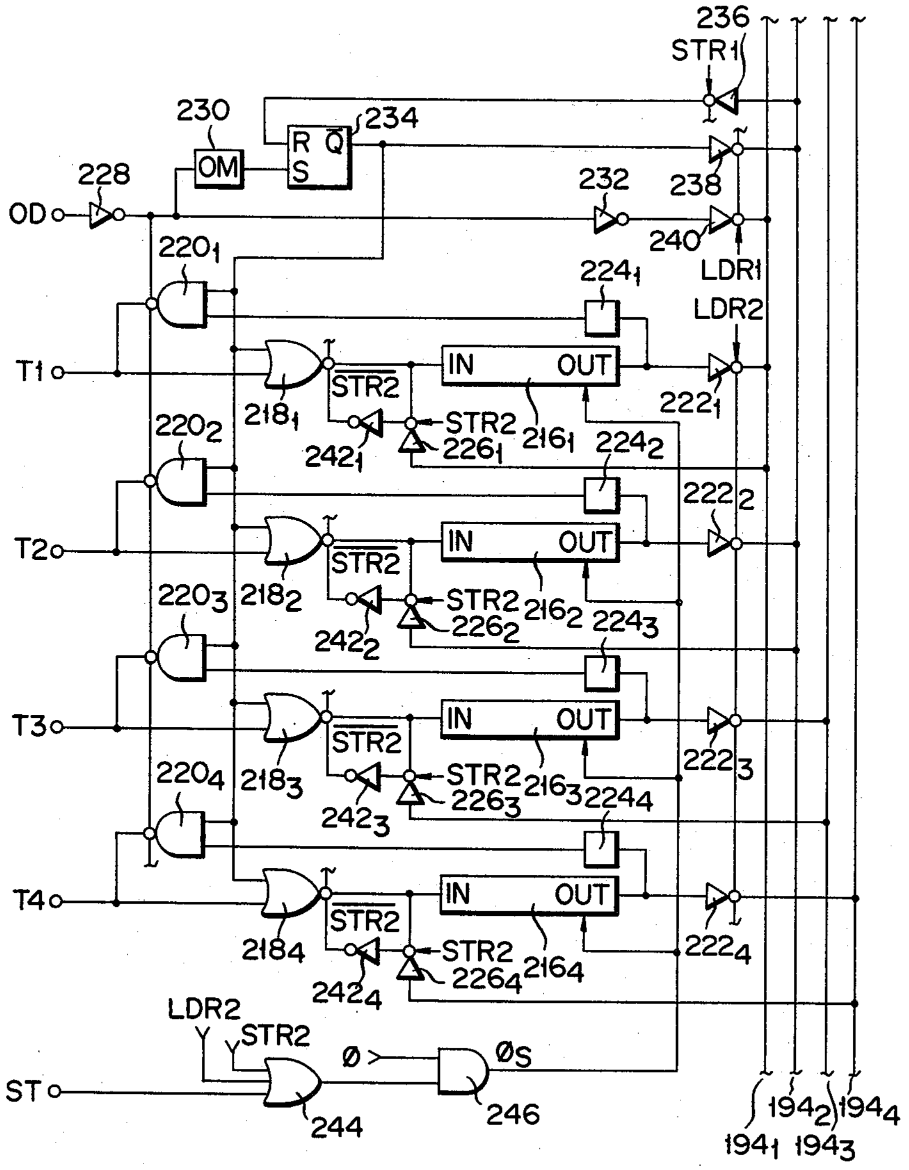
FIG. 11 is a circuit diagram showing an input/output register in the embodiment of FIG. 10.

FIG. 11 shows the input/output register 204 and bus line 194 in detail. As is shown, the input/output register 204 includes four shift registers $216_1$ to $216_4$ each having a capacity of 8 bits. The bus line 194 consists of four bit signal transfer lines $194_1$ to $194_4$. Clocked NOR gates $218_1$ to $218_4$ each have their one input terminal connected to each of the respective input/output terminals $T_1$ to $T_4$, and also clocked NAND gates $220_1$ to $220_4$ have their output terminals connected to the respective input/output terminals $T_1$ to $T_4$. The clocked NOR gates $218_1$ to $218_4$ have their output terminals connected to the input terminals of the respective shift registers $216_1$ to $216_4$. The output terminals of the shift registers $216_1$ to $216_4$ are connected to input terminals of clocked inverters $222_1$ to $222_4$ and also to the input terminals of one-bit registers $224_1$ to $224_4$. The output terminals of the clocked inverters $222_1$ to $222_4$ are connected to the respective bit signal transfer lines $194_1$ to $194_4$ of the bus line 194. The output terminals of the one-bit registers $224_1$ to $224_4$ are connected to the input terminals of the respective clocked NAND gates $220_1$ to $220_4$. To the bit signal transfer lines $194_1$ to $194_4$ of the bus line 194 are connected the input terminals of respective clocked inverters $226_1$ to $226_4$, which have their output terminals connected to the input terminals of the respective shift registers $216_1$ to $216_4$. An inverter 228, which receives the control signal OD at its input terminal, has its output terminal connected to the input terminal of a one-shot circuit 230, the input terminal of an inverter 232 and to the clock input terminals of the clocked NAND gates $220_1$ to $220_4$. The output terminal of the one-shot circuit 230 is connected to a set input terminal of an RS flip-flop 234. A clock inverter 236, which has its input terminal connected to the bit signal transfer line $194_2$ of the bus line 194, has its output terminal connected to a reset input terminal of the RS flip-flop 234. The RS flip-flop 234 has its $\overline{Q}$ output terminal connected to the other input terminals of the clocked NOR gates $218_1$ to $218_4$ and clocked NAND gates $220_1$ to $220_4$ and also to the input terminal of a clocked inverter 238. The output terminal of the clocked inverter 238 is connected to the bit signal transfer line $194_2$ of the bus line 194. The output terminal of the inverter 232 is connected to the input terminal of the clocked inverter 240, and the output terminal of the clocked inverter 240 is connected to the bit signal transfer line $194_1$ of the bus line 194. Of the control signals produced from the instruction decoder 214 a load signal $LD_1$ is supplied to the clock input terminals of the clocked inverters 238 and 240, which invert their input during the high level period of the load signal $LD_1$. Of the control signals produced from the instruction decoder 214 a store signal STR1 is supplied to the clock input terminal of the clocked inverter 236, which inverts its input signal during the high level period of the store signal STR1. Further, a load signal LDR2 or a store signal STR2 from the instruction decoder 214 is supplied to the clock input terminals of the clocked inverters $222_1$ to $222_4$ and $226_1$ to $226_4$, which are held operative invert their input signal during the high level period of the load signal LDR2 or store signal STR2. The store signal STR2 is also inverted by inverters $242_1$ to $242_4$, the outputs of which are supplied to the clocked NOR gates $218_1$ to $218_4$. The clocked NOR gates $218_1$ to $218_4$ are held operative and their input signals are NORed when the outputs of the inverters $242_1$ to $242_4$, that is, the inverted store signal $\overline{STR2}$, are at high level. The clocked NAND gates $220_1$ to $220_4$ are held operative and take the NAND of their respective input signals during the high level period of the output signal of the inverter 228. The control signal ST produced from the microprocessor 84 and the load signal LDR2 and store signal STR2 produced from the instruction decoder 214 are also supplied to respective input terminals of an OR gate 244. The output terminal of the OR gate 244 is connected to one input terminal of an AND gate 246. To the other input terminal of the AND gate 246 is supplied a clock pulse signal $\phi$. The AND gate 246 produces a shift pulse signal $\phi_s$, which is coupled to shift signal input terminals of the shift registers $216_1$ to $216_4$.

The operation of the system having the above construction will now be described.

With an operation voltage applied to the whole system, the oscillator circuit 34 produces the clock pulse signal, and the frequency divider circuit 38 produces successive one-second pulses. Meanwhile, a series of microprograms stored in the ROM 210 is successively read out from successive addresses specified by the output of the program counter 212.

Figure 12:
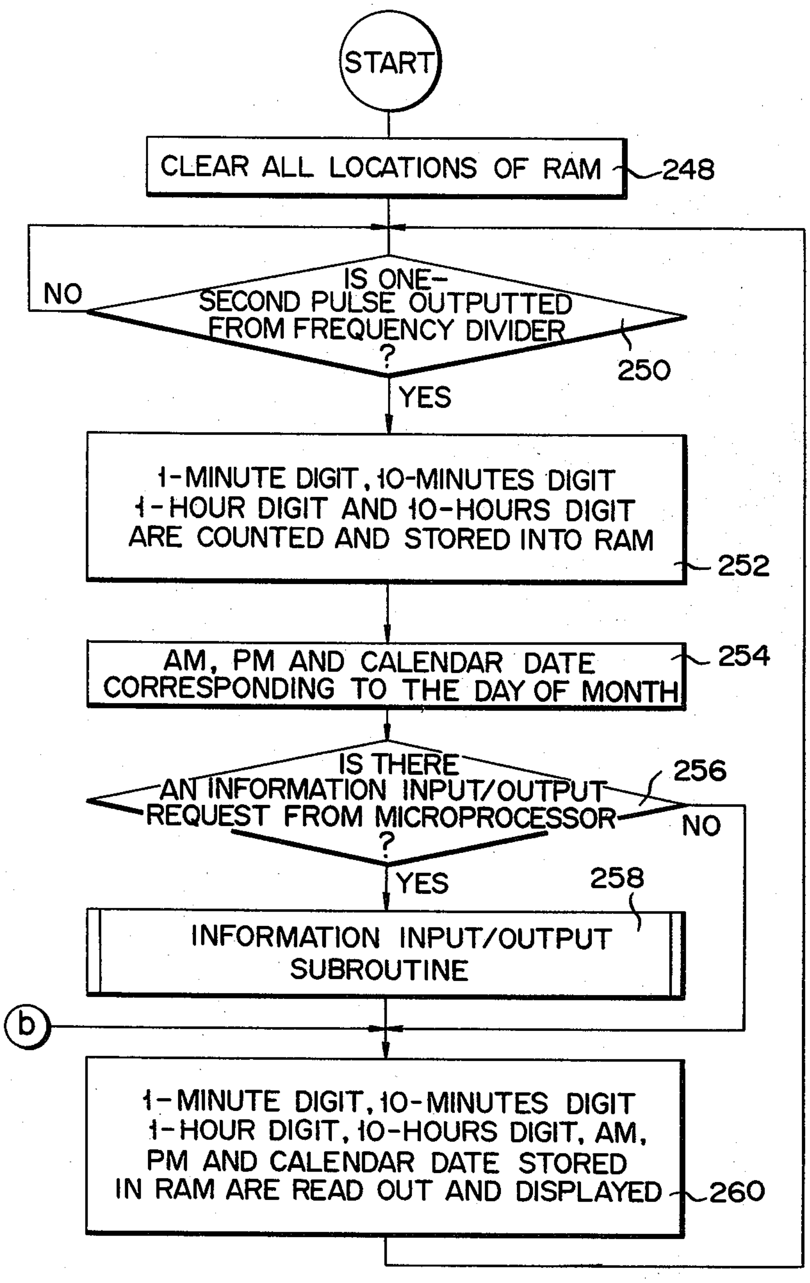
FIG. 12 is a flow chart for illustrating the operation of the embodiment of FIG. 10.

FIG. 12 shows a flow chart of the microprogram functions controlled from the ROM 210.

Each of the control steps shown in the flow chart are executed as each instruction produced from the ROM 210 is decoded in the instruction decoder 214 and the output thereof is supplied to the RAM 196 and ALU 198.

In a first step 248 of the control shown in FIG. 12, all locations of the RAM 196 are cleared.

In the next step 250, whether or not the one-second pulse signal is produced from the frequency divider 38 is checked. If no signal is detected, this step is repeated on and on until the one-second pulse output is detected.

When the one-second pulse output is detected, a step 252 of counting the present time-of-day data in terms of 1-minute, 10-minute, 1-hour and 10-hours digits and successively storing the time data obtained in this way in predetermined address in the RAM 196 is executed.

In a subsequent step 254, a.m., p.m. and calendar data are obtained and successively stored in predetermined addresses in the RAM 196.

Then, in a step 256 whether or not there is any information input/output request from the microprocessor 84 is checked.

When an information input/output request is detected, an information input/output subroutine 258 is executed.

Subsequently, in a step 260 the time data of 1-minute to 10-hours digits and a.m., p.m. and calendar data memorized in the RAM 196 are successively read out and supplied through the display register 206 and display driver 208 to the display unit 70, whereby the time-of-day data and calendar data are displayed. In case if no information input/output request is detected, the step 260 is executed without executing the information input/output subroutine.

After the execution of the step 260 is ended, the series of steps 250 through 260 are executed again. In this way, the time-of-day data and calendar data are displayed consequentively on the display unit 70.

When an information output request from the microprocessor 84 connected to the input/output register 204 is produced, the microprocessor 84 holds the control signal OD at "high" level as shown in FIG. 13A. Then, it successively supplies operation codes $OPC_1$ to $OPC_3$ and write data $WD_1$ to $WD_3$ each consisting of four bits (as shown in FIG. 13C) to the input/output terminals $T_1$ to $T_4$ while also holding the control signal ST at "high" level in synchronism to the output timing of the signals $OPC_1$ to $OPC_3$ and $WD_1$ to $WD_3$ (as shown in FIG. 13B). In case when an information input request from the microprocessor 84 is produced, the microprocessor 84 holds the control signal OD at "high" level (as shown in FIG. 13D), and it successively supplies the 4-bit operation codes $OPC_1$ to $OPC_3$ (as shown in FIG. 13F) to the input/output terminals $T_1$ to $T_4$ while also holding the control signal ST at "high" level in synchronism to the output timing of the signals $OPC_1$ to $OPC_3$ (as shown in FIG. 13E).

Here, the information output request from the microprocessor 84 means a request of data transfer from microprocessor 84 to RAM 196, and the information input request is a request of data transfer from RAM 196 to microprocessor 84.

FIG. 14 shows details of the operation codes $OPC_1$ to $OPC_3$. Each operation code consists of four bits, which are coupled to the respective input/output terminals $T_1$ to $T_4$. In the operation code $OPC_1$, the first bit is always at "high" level or "1". The second bit is set to either "high" level or "low" level to represent the information input/output request state R/W; at the time of the information input request it is set to "high" level while at the time of the information output request it is set to "low" level. The third and fourth bits of this operation code $OPC_2$ and the four bits of the operation code $OPC_2$, that is, a total of six bits, contain address data $A_1$ to $A_6$ for specifying addresses in the RAM 196. These address data $A_1$ to $A_6$ specify one of the 1-minute to 10-hours digits of the time-of-day data or a.m., p.m. and calendar data to be stored in the RAM 196. The four bits of the operation code $OPC_3$ contain respective digit data $D_1$ to $D_4$ for specifying digits of the digit in addresses specified by the address data $A_1$ to $A_6$.

Figure 15:
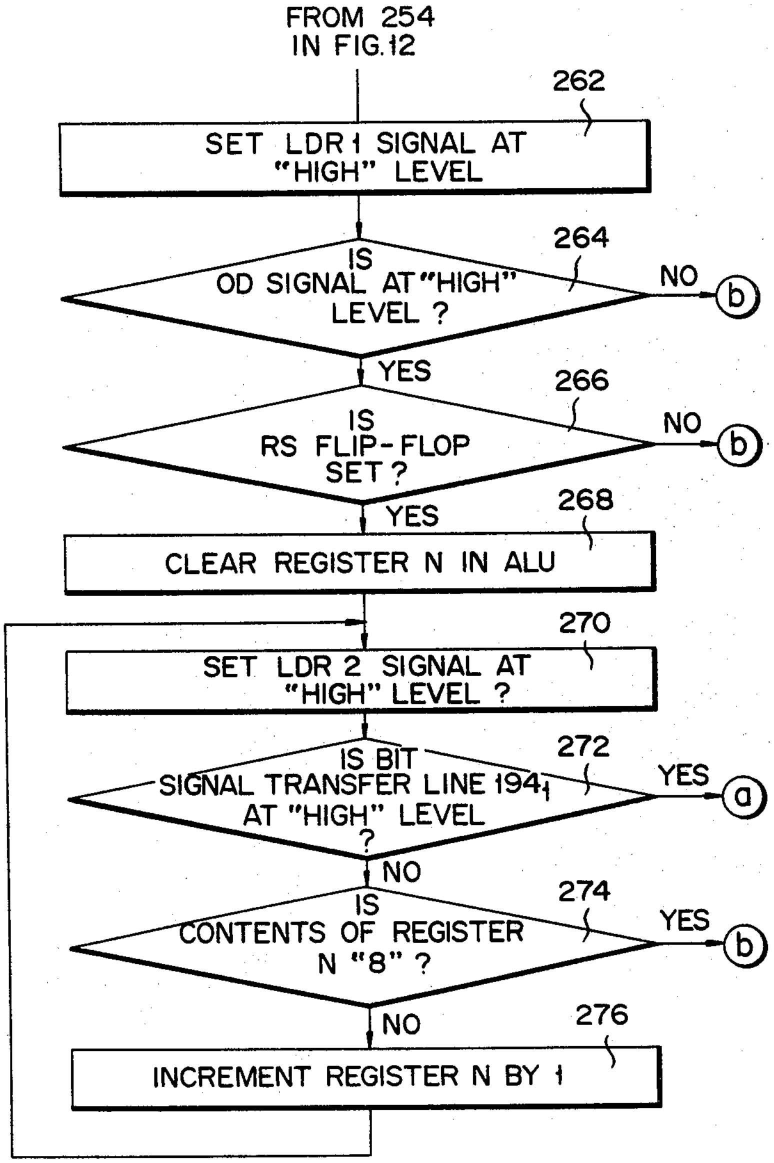
FIGS. 15 through 16 are detailed flow charts which are part of the flow chart shown in FIG. 12.
Figure 16:
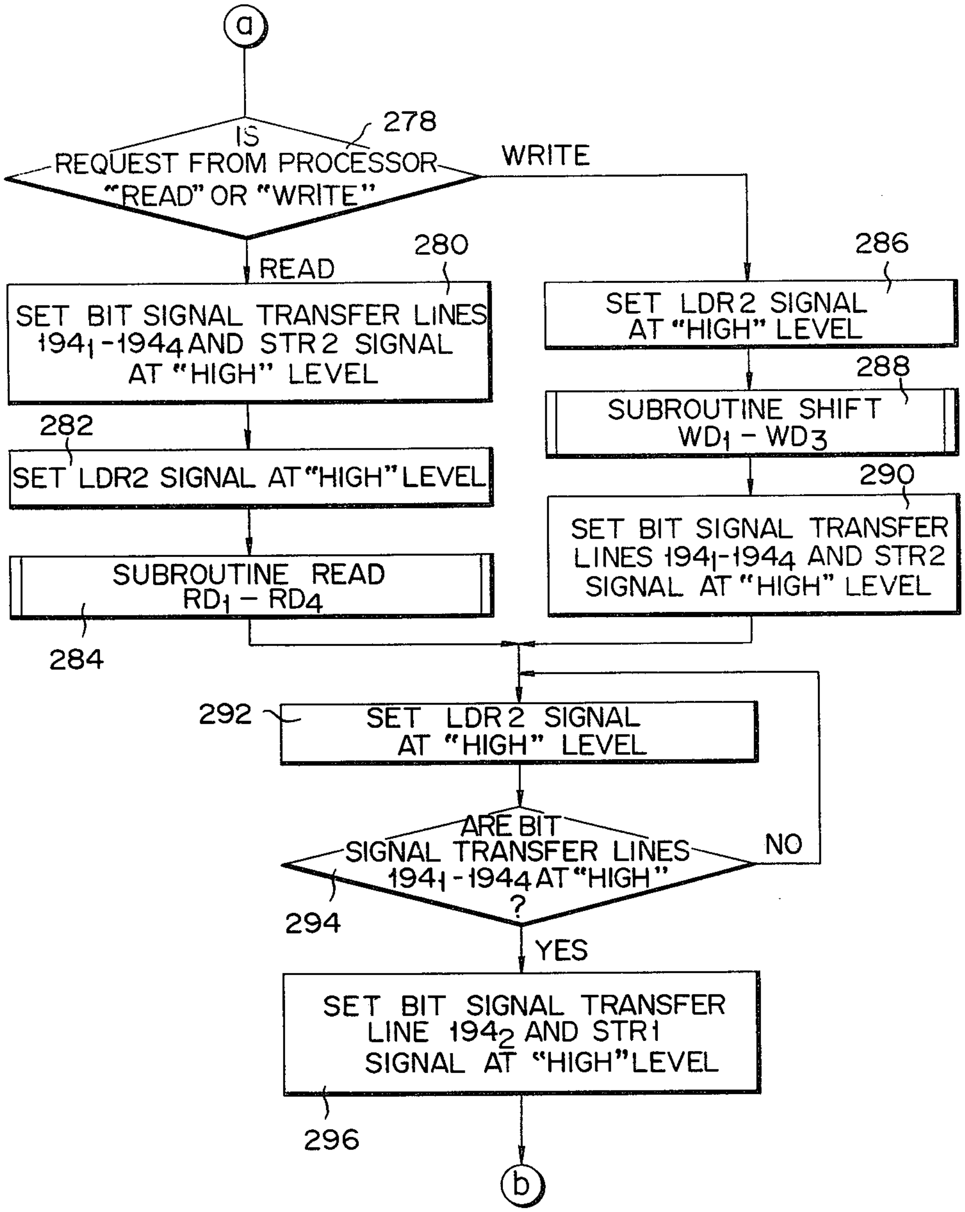

FIGS. 15 and 16 show the step 256 and subroutine 258 in the flow chart of FIG. 12 in detail. As is shown, the step 256 for determining whether or not there is an information input/output request consists of two steps 262 and 264. In the step 262, the load signal LDR1 is set to "high" level. With the signal LDR1 set to "high" level, the clocked inverter 240 is rendered operative and inverts the input signal.

When the control signal OD is at "low" level, the output of the inverter 228 is at "high" level, the output of the following inverter 232 is at "low" level, and the output signal of the following clocked inverter 240, that is, on the bit signal transfer line $194_1$, is at "high" level. When the control signal OD is inverted to "high" level, the signal on the bit signal transfer line $194_1$ is inverted to low level.

If it is determined in the step 264 that the signal on the bit signal transfer line $194_1$ is at "high" level, that is, the control signal OD is at "low" level, the next step 260 (in the flow chart of FIG. 12) is executed to obtain the display.

If an information input request is detected from the "low" level of the bit signal transmission line $194_1$, that is, the "high" level of the control signal OD, the subroutine 258 is executed. The subroutine 258 consists of steps 266 through 296 as shown in FIGS. 15 and 16. After the detection of the "high" level of the control signal OD in the step 264, whether or not the $\bar{Q}$ output signal of the RS flip-flop 234 is at "low" level, that is, whether or not the RS flip-flop 234 is in the set state, is checked in the step 266. With the inversion of the "output" signal of the inverter 228 to "low" level caused with the appearance of the "high" level of the control signal OD, the one-shot circuit 230 is actuated in synchronism to the falling of the output signal of the inverter 228, and its output signal is held at low level for a predetermined period of time from that moment. With the falling of the output signal of the one-shot circuit 230 to "low" level the RS flip-flop 234 is set, with its $\bar{Q}$ output inverted from "high" to "low" level. With the inversion of the $\bar{Q}$ output to "low" level, the output signal of the clocked inverter 238, which receives the signal LDR1 as clock input, that is, the signal on the bit signal transfer line $194_2$, is inverted to "high" level.

If it is determined in the step 266 that the bit signal transfer line $194_2$ is at "low" level, that is, the RS flip-flop 234 is in the reset state, the step 260 is executed for the display. On the other hand, if the "high" level of the bit signal transfer line $194_2$, that is, the set state of the RS flip-flop 234, is detected, the step 268 is executed.

Meanwhile, after the setting of the control signal OD to "high" level the microprocessor 84 successively supplies the operation codes $OPC_1$ to $OPC_3$ and write data $WD_1$ to $WD_3$ as shown in FIGS. 13A through 13C or only the operation codes $OPC_1$ to $OPC_3$ as shown in FIGS. 13D through 13F. Also, the microprocessor 84 sets the control signal ST to "high" level in synchronism to the output timing of the operation codes $OPC_1$ to $OPC_3$ and write data $WD_1$ to $WD_3$. During the "high" level period of the control signal ST the OR gate 244 also produces a "high" level output signal, and the following AND gate 246 produces a "high" level shift signal $\phi$, which is at "high" level when both of the control signal ST and clock pulse $\phi$ are at "high" level. During the period, during which the operation codes $OPC_1$ to $OPC_3$ and write data $WD_1$ to $WD_3$ are produced from the microprocessor 84, the store signal STR2 is at "low" level, and the clocked NOR gates $218_1$ to $218_4$ connected to the input terminals of the respective shift registers $216_1$ to $216_4$ are held operative and invert the respective bit signals of the operation codes $OPC_1$ to $OPC_3$ and write data produced from the microprocessor 84. Then, the shift registers 216$_1$ to 216$_4$ successively store the output signals from the clocked NOR gates 218$_1$ to 218$_4$ in synchronism to the shift pulse signal. In this way, the bit signals of the operation codes $OPC_1$ to $OPC_3$ and write data $WD_1$ to $WD_3$ are stored in the inverted state in the shift registers 216$_1$ to 216$_4$.

In the step 268, the stored data in a register N in the ALU 198 is cleared. Then, the signal LDR2 is held at "high" level for a predetermined period of time. With the signal LDR2 set to "high" level, the OR gate 244 produces a "high" level output signal, and the following AND gate 246 produces a shift pulse $\phi_s$. With the shift pulse $\phi_s$ coupled to the shift registers 216$_1$ to 216$_4$ the bit signals having been stored therein are shifted to the one-bit output side thereof. As the memory contents in the shift registers 216$_1$ to 216$_4$ are shifted bit by bit, the bit signals having been stored in the location closest to the output side are output to be supplied to the respective 1-bit registers 224$_1$ to 224$_4$ and also to the respective clocked inverters 222$_1$ to 222$_4$. The 1-bit registers 224$_1$ to 224$_4$ store the output signals from the respective shift registers 216$_1$ to 216$_4$. Also, the clocked inverters 222$_1$ to 222$_4$, which are held operative at this time with the "high" level signal LDR2 signal coupled to their clock input terminals, invert the output signals from the respective shift registers 216$_1$ to 216$_4$. The output signals from the clocked inverters 222$_1$ to 222$_4$ are supplied to the bit signal transfer lines 194$_1$ to 194$_4$. Then, whether or not the bit signal transfer line 194$_1$ is at "high" level is checked in the step 272.

If it is detected that this level is not at "high", whether or not the contents in the register N represents "8" is checked in the step 274. If the detected data does not represent "8", the contents of the register is increased by "1" in the step 276, and then the step 270 is executed again.

As the series of steps 270 through 276 is repeatedly executed, the bit signals stored in the shift registers 216$_1$ to 216$_4$ are progressively shifted to the output side. When the bit signal of the first bit of the operation code $OPC_1$, first loaded into the shift register 216$_1$, is supplied through the clocked inverter 222$_1$, it is determined in the step 272 that the bit signal transfer line 194$_1$ is at "high" level, and the next step 278 is performed. In the meantime, if it is determined in the step 272 that the bit signal transfer line 194$_1$ is not at "high" level and also it is determined in the next step 274 that the contents of the register N represents "8", that is, in case when the microprocessor 84 does not output the operation codes $OPC_1$ to $OPC_3$ and write data $WD_1$ to $WD_3$ although the control signal OD is set to "high" level, the step 260 is executed for the display.

In the step 278, whether or not the bit signal of the second bit of the operation code $OPC_1$ first loaded into the shift register 216$_2$ is checked. If this bit is determined to be at "high" level, the aforementioned information input request from the microprocessor 84 is produced. In this case, if the operation codes $OPC_1$ to $OPC_3$ alone are stored in the shift registers 216$_1$ to 216$_4$, the step 280 is executed. On the other hand, if the bit signal of the second bit of the operation code $OPC_1$ is determined to be at low level, the information output request is produced in the microprocessor 84. In this case, if the operation codes $OPC_1$ to $OPC_3$ and write data $WD_1$ to $WD_3$ are stored in the shift registers 216$_1$ to 216$_4$, the step 286 is executed.

In the step 280, the bit signal transfer lines are all set to high level, and also the store signal STR2 is held at "high" level for a predetermined period of time. Thus, in this step 280 the "high" level signals on the bit signal transfer lines 194$_1$ to 194$_4$ are inverted by the clocked inverters 226$_1$ to 226$_4$, which receive the store signal STR2 as clock input, and the inverted signals are stored in the respective shift registers 216$_1$ to 216$_4$ at a location thereof closest to the input side. In other words, when the step 280 is executed, "low" level signal is loaded into each of the shift registers 216$_1$ to 216$_4$ at a location closest to the input terminal. Before the step 282 the individual bit signals of the operation code $OPC_1$ have already been supplied to the ALU 198 through the bit signal transfer lines 194$_1$ to 194$_4$. In the step 282, the load signal LDR2 are held at "high" level for two consecutive predetermined periods of time. In consequence, the operation codes $OPC_2$ and $OPC_3$ which have been stored in the inverted state in the shift registers 216$_1$ to 216$_4$ are inverted by the clocked inverters 222$_1$ to 222$_4$ before being output to the bit signal transfer lines 194$_1$ to 194$_4$. These operation codes $OPC_2$ and $OPC_3$ are supplied to the ALU 198.

In the subsequent subroutine 284, the operation codes $OPC_2$ and $OPC_3$ are decoded, and data for digits corresponding to the digit number information $D_1$ to $D_4$ are read out from the RAM 196 with the information stored in the addresses in the RAM 196 corresponding to the address information $A_1$ to $A_6$ as leading information, with the store signal STR2 being held at "high" level for a predetermined period of time every time a digit is read out.

Figure 17:
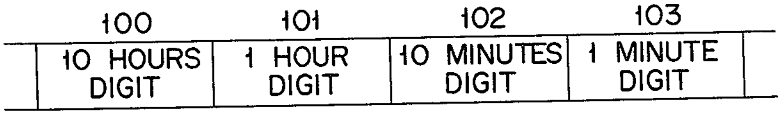
FIG. 17 shows part of the memory map for illustrating the operation of the embodiment of FIG. 10.

It is assumed that in the RAM 196 time count data for the 10-hours, 1-hour, 10-minutes and 1-minute digits are stored in respective addresses 100 to 103 as shown in FIG. 17. If the address 100 is specified by the address information $A_1$ to $A_6$ and four digits are specified by the digit number information, data for four digits, namely the 10-hours to 1-minute digits, are successively read out as read data $RD_1$ to $RD_4$ from the data for the 10-hours digit stored in the address 100 as leading information and are supplied to the bit signal transfer lines 194$_1$ to 194$_4$. With the store signal STR2 inverted to "high" level at the time of the read-out of the read data $RD_1$ to $RD_2$, the clocked inverters 226$_1$ to 226$_6$ are rendered operative to successively couple the input read data $RD_1$ to $RD_4$ after inverting them. Meanwhile, with the appearance of the "high" level store signal STR2 the AND gate 246 produces the shift pulse $\phi_s$ so that the shift registers 216$_1$ to 216$_4$ store the respective read data $RD_1$ to $RD_4$ in the inverted state in synchronism to the shift pulse $\phi_s$. After the loading of the read data $RD_1$ to $RD_4$ is completed, the signal LDR2 is held at "high" level for a predetermined period of time. With the setting of the signal LDR2 to "high" level, the data stored in the shift registers 216$_1$ to 216$_4$ are shifted bit by bit to the output side. Then, whether or not all the bit signal transfer lines 194$_1$ to 194$_4$ are at "high" level are checked in the step 294. If not, the step 292 is executed again. This step 292 is repeated until all the bit signal transfer lines 194$_1$ to 194$_4$ are detected to be at "high" level. When "low" level signals stored in the shift registers 216$_1$ to 216$_4$ are output therefrom in the afore-mentioned shift operation of the step 280, the clocked inverters 222$_1$ to 222$_4$ produce respective "high" level output signals, and in this case it is detected in the step 294 that all the bit signal transfer lines are at "high" level. After the execution of the step 294, the read data have been stored in the inverted state in the shift registers $216_1$ to $216_4$ in the order of $RD_1$, $RD_2$, $RD_3$ and $RD_4$ from their output side. When it is determined in the step 294 that all the bit signal transfer lines are at "high" level, in the step 296 the store signal STR1 is held at "high" level for a predetermined period of time while the bit signal transfer line $194_2$ is held at "high" level. With the appearance of the "high" level store signal STR1, the clocked inverter 236 is rendered operative, so that its output signal is inverted from "high" level to "low" level. As a result, the flip-flop circuit 234 which has been in the set state is reset, and its $\bar{Q}$ output signal is inverted to "high" level. With the inversion of the $\bar{Q}$ output signal to "high" level the clocked NOR gates $218_1$ to $218_4$, which receive this "high" level signal, are set to an inhibition state to inhibit the transfer of data from the microprocessor 84 to the shift registers $216_1$ to $216_4$. After this step 296 is ended, the step 260 is executed.

Meanwhile, in the step 286 the load signal LDR2 is held for two consecutive predetermined periods of time. In this step, the operation codes $OPC_2$ and $OPC_3$ having been stored in the inverted state in the shift registers $216_1$ to $216_4$ are inverted by the clocked inverters $222_1$ to $222_4$ and then output to the bit signal transfer lines $194_1$ to $194_4$. After the step 286 is ended, the subroutine 288 is executed. In this subroutine 288, the load signal LDR2 in a predetermined circuit is held at "high" level for predetermined periods of time. Every time the "high" level load signal LDR2 appears, the write data stored in the inverted state in the shift registers $216_1$ to $216_4$ are progressively shifted and then inverted by the clocked inverters $222_1$ to $222_4$ to be supplied to the bit signal transfer lines $194_1$ to $194_4$. Also in this subroutine, the operation codes $OPC_1$ to $OPC_3$ are decoded, and the write data $WD_1$ to $WD_3$ are memorized in the RAM 196 according to the digit number information $D_1$ to $D_4$ with the address corresponding to the address information $A_1$ to $A_6$ as leading address.

After the above subroutine is executed, the step 290 is executed. In the step 290, the bit signal transfer lines $194_1$ to $194_4$ are all set to "high" level, and also the store signal STR2 is set to "high" level for a predetermined period of time. Thus, in this step 290 "low" level signal is memorized in each of the shift registers $216_1$ to $216_4$ on the input side thereof similar to the step 280. After the execution of the step 290, the step 292 is executed.

The step 292 is repeatedly executed eight times, and then it is detected in the step 294 that all the bit signal transfer lines $194_1$ to $194_4$ are at "high" level. Then, the step 294 is executed, and the RS flip-flop circuit 234 is reset. Thereafter, the step 260 is executed. At this time, if data obtained by the time count data stored in the RAM 196 are stored as the write data $WD_1$ to $WD_3$ in the shift registers $216_1$ to $216_4$, corrected time-of-day data and calendar data can be displayed in the step 260. Also, it is possible to store data irrelevant to the time count data as the write data $WD_1$ to $WD_3$ in the RAM 196 and thus use the display unit 70 for the display of the result of data processing in the microprocessor 84 in addition to the display of the time-of-day data.

When an out-of-processing period is produced in the microprocessor 84 after the loading of the read data $RD_1$ to $RD_4$ from the RAM 196 into the shift registers $216_1$ to $216_4$ in the subroutine 284, the microprocessor 84 holds the control signal ST for a predetermined period of time. With the control signal ST set to "high" level the AND gate 246 produces the shift pulse $\phi_s$. With this shift pulse $\phi_s$ coupled to the shift registers $216_1$ to $216_4$, they successively output the read data $RD_1$ to $RD_4$ which have been stored in the inverted state. At this time, if the conditions that the RS flip-flop circuit 234 is reset and producing the "high" level signal as $\bar{Q}$ output signal and that the control signal OD is at "low" level are met, the clocked NAND gates $220_1$ to $220_4$ invert the data output from the shift registers $216_1$ to $216_4$.

Thereafter, the microprocessor 84 can perform data processing with the afore-mentioned read data $RD_1$ to $RD_4$ as time data. Since the time count data and calendar data temporarily stored in the RAM 196 are supplied as the read data $RD_1$ to $RD_4$ through the input/output register 204 to the microprocessor 84 in the aforementioned way, the microprocessor need not carry out such data processing as counting the time instant or determining the time-of-day data from the display drive signal, so that the processing efficiency in case of effecting data processing with time information on the side of the microprocessor can be increased.

In addition, the construction of the system where the clock LSI circuit device according to the invention is used in combination with the microprocessor 84 can be simplified since it is only necessary to connect the clock LSI circuit device to the microprocessor 84.

Figure 18:
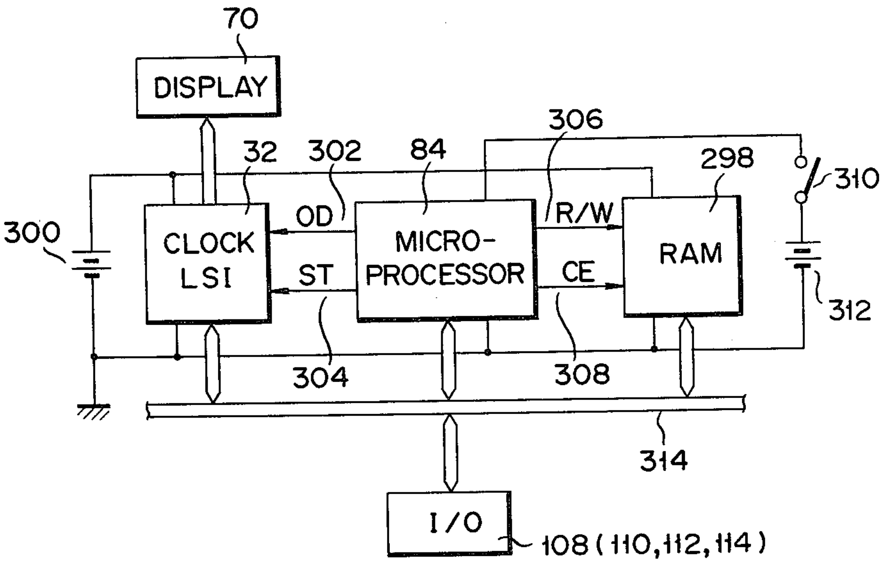
FIG. 18 is a schematic showing an example of application of the invention.

FIG. 18 shows a block diagram of an example of the application of the invention. In the Figure, like parts as those in FIG. 3 are designated by like reference numerals. Clock LSI circuit device 32 is furnished with an operating voltage from a battery 300. Thus, the clock LSI circuit device 32 always counts time-of-day data, and the time count data are supplied to display unit 70. Consequently, the display unit 70 always displays the time-of-day data. Further, control signals OD 302 and ST 304 are supplied from the microprocessor 84 to the clock LSI circuit device 32, while read/write control signal R/W 306 and chip select signal CE 308 are supplied from the microprocessor 84 to a RAM 298.

The RAM 298 is furnished with operating voltage from the battery 300, while the microprocessor 84 is furnished with operating voltage from a battery 312 through a switch 310. A bus line 314 is connected to the clock LSI circuit device 32, RAM 298 and I/O interface circuits 108 (i.e., 110, 112 and 114 in FIG. 3). With this construction, the microprocessor 84 may be rendered operative by closing the switch 310 when and only when required, and by so doing the display of the time-of-day data or the result of data processing in the microprocessor 84 on the display unit 70 can be obtained without wasteful power consumption at times when it is not necessary to supply power to the microprocessor.

What is claimed is:

1. A clock integrated circuit device comprising in a single-chip structure:

an internal bus;

a pulse generating means for producing a clock pulse signal;

a program memory means for storing microprograms;

a time counting means connected to said internal bus for counting time-of-day data through data processing with said clock pulse signal in accordance with a series of microprograms supplied from said program memory means;

a time-of-day data memory means connected to the internal bus for storing data corresponding to said time-of-day data;

an information input/output means connected to said internal bus and having register means for storing hour, minute, and second data received from said time-of-day data memory means for outputting said data in response to an external data transfer command; and a display control circuit, including display means, connected to said internal bus for producing a control signal for displaying on said display means time count data obtained from said time counting means;

said information input/output means including:

a terminal for receiving external control data instructing a data input operation;

a terminal for receiving external control data instructing a data output operation;

input/output terminals for receiving data from a central processing unit and supplying data to said central processing unit;

shift registers each consisting of a plurality of bits for storing data from said central processing unit or data supplied to said clock integrated circuit device;

one-bit registers each connected to the output side of each of said shift registers for storing leading bit data from the associated shift register;

first clocked logic circuits held closed to inhibit output of data from said shift registers to said input/output terminals at the time of the data input operation and held open to permit output of data from said shift registers to said input/output terminals at the time of the data output operation;

second clocked logic circuits held open to permit writing of data coupled to said input/output terminals into said shift registers at the time of the data input operation and held closed to inhibit writing of data coupled to said input/output terminals into said shift registers at the time of the data output operation;

first clocked inverters connected to the output side of said shift registers for coupling data outputted from said shift registers to a bus line under the control of a load signal;

second clocked inverters connected between said bus lines and the input side of said shift registers for coupling data on said bus line to said shift registers under the control of a store signal;

third clocked inverters connected between said second clocked inverters and said second logic circuits for coupling a control signal to said second clocked logic circuits to inhibit data outputted from said second clocked logic circuits so that data supplied to said input/output terminals should not be coupled to said shift registers at the time when data on said bus line are being stored in said shift registers;

a first logic circuit for permitting selective passage therethrough of said external control data instructing a data output operation as well as said load signal and store signal;

a second logic circuit for permitting passage therethrough of the output of said first logic circuit in synchronism to a basic clock signal from said central processing unit;

a flip-flop for coupling a control data to said first and second clocked logic circuits and also supplying said control data through said bus line to said central processing unit under the control of an input instruction at the time of the data input operation and coupling an input instruction received from said central processing unit through said bus line to said first and second logic circuits at the time of the data output operation;

a fourth clocked inverter connected between said bus line and said flip-flop for coupling an output instruction received from said central processing unit to said flip-flop under the control of a store signal; and a fifth clocked inverter connected between said bus line and said flip-flop for coupling an input instruction from said flip-flop to said bus line under the control of a load signal.

2. A clock integrated circuit device adapted to be connected to an external central processing unit (CPU), comprising, an oscillator circuit for producing a clock pulse signal;

a frequency divider for frequency dividing said clock pulse signal to a predetermined frequency;

a time measuring circuit for counting successive output pulses from said frequency divider;

a switch input circuit connected to said time measuring circuit for supplying control signals for executing correction of measured time and elapsed time functions in said time measuring circuit;

a display drive signal generating means connected to said time measuring circuit for decoding time data outputted from said time measuring circuit to produce a corresponding display drive signal; and a digit selection circuit means connected to said time measuring circuit for transmitting time data from said time measuring circuit to said CPU in response to a control signal produced by said CPU when it requires said time data, said digit selection circuit means including a first frequency divider for frequency dividing a clock pulse signal produced from said central processing unit to one-half, a second frequency divider for frequency dividing the output of said first frequency divider to one-half, a plurality of logic circuits for receiving the output signals from said first and second frequency dividers and producing a first to fourth clock pulse signals, and a plurality of gate means for receiving the output signals from said plurality of logic circuits and producing signals representing 1-minute, 10-minutes, 1-hour, and 10-hours digits.

3. A clock integrated circuit device adapted to be connected to an external central processing unit (CPU), comprising:

an oscillator circuit for producing a clock pulse signal;

a frequency divider for frequency dividing said clock pulse signal to a predetermined frequency;

a time measuring circuit for counting successive output pulses from said frequency divider;

a switch input circuit connected to said time measuring circuit for supplying control signals for executing correction of measured time and elapsed time functions in said time measuring circuit;

a timing signal generating means connected to said frequency divider circuit for producing a digit selection signal for selecting a digit constituting time data;

a gate circuit group connected to said time measuring circuit for selectively passing time data output from said time measuring circuit according to said digit selection signal;

a digit driver connected to said timing signal generating means for supplying digit data to a display means external to said clock integrated circuit device by receiving digit selection data from said timing signal generating means;

a segment decoder connected to said gate circuit group for decoding time data produced from said gate circuit group into corresponding display drive signals;

a segment driver connected to said segment decoder for supplying display drive signals for displaying said time data to said display means; and a digit selection circuit means comprising first gate means for supplying a digit selection data signal from said timing signal generating means to said CPU and second gate means for supplying 1-minute, 10-minutes, 1-hour, and 10-hours digits from said time measuring circuit to said CPU, said first and second gate means being controlled by control signals produced by said CPU.

4. A clock integrated circuit device comprising:

an oscillator circuit for producing a clock pulse signal;

a frequency divider for frequency dividing said clock pulse signal to a predetermined frequency;

a time measuring circuit for counting successive output pulses from said frequency divider;

a switch input circuit connected to said time measuring circuit for supplying control signals for executing correction of measured time and elapsed time functions in said time measuring circuit;

a timing signal generating means connected to said frequency divider for producing a digit selection signal for selecting a digit constituting time data;

a digit selection circuit means for permitting selective passage therethrough of time data produced from said time measuring circuit and also from said timing signal generating means;

a digit driver connected to said timing signal generating means for supplying digit data to a display means external to said clock integrated circuit device by receiving digit selection data through said timing signal generating means;

a switching circuit means connected to said digit selection circuit means and supplying the time data output from said digit selection circuit means to a central processing unit and to said display means according to a control signal supplied from said central processing unit;

a segment decoder connected to said switching circuit and decoding the time data outputted from said switching circuit means into a corresponding display drive signal;

a segment driver connected to said segment decoder to supply a display drive signal for displaying time data to said display means; and said switching circuit means including:

first gate means connected to said digit selection circuit means for inverting digit data from said digit selection circuit means;

second gate means connected to said first gate means for coupling the inversion output from said first gate means after inversion to said segment decoder;

third gate means connected to said first gate means for inverting and coupling the inversion output of said first gate means after inversion to said central processing unit;

fourth gate means connected in parallel with and in opposite polarity relation to said third gate means for coupling the inversion output of said third gate means after inversion to said second gate means; and first and second logic circuits for supplying a control signal from said central processing unit to the individual clock input terminals of said third and fourth gate means respectively.

* * * * *

UNITED STATES PATENT AND TRADEMARK OFFICE

CERTIFICATE OF CORRECTION

PATENT NO. : 4,342,092

DATED : July 27, 1982

INVENTOR(S) : Shigeki Kumagi

It is certified that error appears in the above-identified patent and that said Letters Patent is hereby corrected as shown below:

On The Title Page, inventor's name should read

-- Shigeki Kumagai --.

Signed and Sealed this

*Twenty-sixth* Day of *October 1982*

[SEAL]

*Attest:*

GERALD J. MOSSINGHOFF

*Attesting Officer* *Commissioner of Patents and Trademarks*